(12) United States Patent
Luchangco et al.

(10) Patent No.: US 7,720,891 B2
(45) Date of Patent: May 18, 2010

(54) SYNCHRONIZED OBJECTS FOR SOFTWARE TRANSACTIONAL MEMORY

(75) Inventors: Victor M. Luchangco, Cambridge, MA (US); Virendra J. Marathe, Rochester, NY (US)

(73) Assignee: Oracle America, Inc., Redwood Shores, CA (US)

( * ) Notice: Subject to any disclaimer, the term of this patent is extended or adjusted under 35 U.S.C. 154(b) by 812 days.

(21) Appl. No.: 11/353,478

(22) Filed: Feb. 14, 2006

(65) Prior Publication Data

US 2007/0198518 A1    Aug. 23, 2007

(51) Int. Cl.
    G06F 12/00 (2006.01)
(52) U.S. Cl. .................................................. 707/826
(58) Field of Classification Search ............ 707/1, 707/3; 711/168
    See application file for complete search history.

(56) References Cited

U.S. PATENT DOCUMENTS

| | | | |
|---|---|---|---|
| 5,428,761 A * | 6/1995 | Herlihy et al. | 711/130 |
| 6,289,343 B1 * | 9/2001 | Freund et al. | 707/8 |
| 2004/0010502 A1 * | 1/2004 | Bomfim et al. | 707/100 |
| 2004/0015642 A1 * | 1/2004 | Moir et al. | 711/1 |
| 2004/0034673 A1 * | 2/2004 | Moir et al. | 707/204 |
| 2006/0173885 A1 * | 8/2006 | Moir et al. | 707/101 |

OTHER PUBLICATIONS

Luchangco et al., "Transaction Synchronizers", Oct. 2005, SCOOL 05. pp. 49-65.*

Garcia-Molina, SAGAS, Princeton University, Dec. 1, 1987.*
Herlihy et al., "Software Transactional Memory for Dynamic-Sized Data Structures", Jul. 2003, ACM, pp. 92-100.*
Marathe et al., "Adaptive Software Transactional Memory", 2005, Dept. of Computer Science, Univ. of Rochester, pp. 1-15.*
Casey Marshall, "Software Transactional Memory", Dec. 1, 2005, Univ. of California, Santa Cruz, pp. 1-13.*
Nir Shavit and Dan Touitou, "Software Transactional Memory," Appeared in the 14th ACM Symposium on the Principles of Distributed Computing, 1995, 34 pages.
Tim Harris, "Language Support for Lightweight Transactions," ACM, 2003, 15 pages.

(Continued)

*Primary Examiner*—Don Wong
*Assistant Examiner*—Michael Le
(74) *Attorney, Agent, or Firm*—Robert C Kowert; Meyertons, Hood, Kivlin, Kowert & Goetzel, P.C.

(57) ABSTRACT

A system for implementing synchronized objects for software transactional memory may include one or more processors and a memory storing program instructions executable by the processor to implement a transactional-memory manager configured to coordinate memory access requests directed at the memory from a plurality of transactions. The transactional-memory manager records, within a collaborator record for a shared data object in the memory, identifications of a set of two or more transactions that have requested synchronization on the object. In response to a commit request from a given transaction of the set, the transactional-memory manager determines whether to commit or abort the given transaction based at least in part on the transactional states of other transactions in the set, examining the collaborator record to identify the other transactions.

20 Claims, 12 Drawing Sheets

OTHER PUBLICATIONS

Maurice Herlihy, et al., "Transaction Memory: Architectural Support for Lock-Free Data Structures," Proceedings of $20^{th}$ Annual Int'l Symposium on Computer Architecture, 1993, 12 pages.

U.S. Appl. No. 11/263,439.

U.S. Appl. No. 11/263,414.

* cited by examiner

SYNCHRONIZED OBJECTS FOR SOFTWARE TRANSACTIONAL MEMORY

BACKGROUND OF THE INVENTION

1. Field of the Invention

The present invention is directed to computer systems. More particularly, it is directed to synchronization mechanisms for computer systems implementing transactional memory.

2. Description of the Related Art

In the field of computer systems, considerable effort has been expended on developing techniques to support concurrent access to shared resources. Mutual exclusion locks and monitors represent two traditional concurrent programming synchronization mechanisms. Locks and monitors protect shared resources by separating access to them in time; for example, in one implementation, as long as a given thread of execution retains a lock on an object or resource, no other thread of execution may modify the object, and any other thread attempting to modify the object may be blocked from further execution until the lock is released.

However, locking techniques are known to suffer from several limitations. Coarse-grained locks, which protect relatively large amounts of data, often do not scale. For example, threads of execution on a multiprocessor system may block each other even when they do not actually require concurrent access to the same data. Fine-grained locks may resolve some of these contention issues, but only at the cost of added programming complexity and the increased likelihood of problems such as deadlocks. Locking schemes may also lead to an increased vulnerability to thread failures and delays—e.g., a thread that is preempted or does expensive input/output operations while holding a lock may obstruct other threads for relatively long periods, thereby potentially reducing the overall throughput of the system.

The transactional-memory programming paradigm has been gaining momentum as an approach of choice for replacing locks in concurrent programming. In transactional-memory programming, sequences of concurrent operations may be combined into nonblocking atomic transactions, thus making parts of the code appear to be sequential without the need to use locks. Executing threads indicate transaction boundaries, e.g., by specifying when a transaction starts and when it ends, but do not have to acquire locks on any objects. Transactional-memory programming techniques may allow transactions that do not overlap in data accesses to run uninterrupted in parallel; transactions that do overlap may be aborted and retried.

The atomicity and isolation of transactions may significantly simplify concurrent programming. Atomicity is a property that guarantees that either all steps in a transaction succeed, or the entire transaction is rolled back, thus giving the impression that the transaction never occurred. Isolation refers to the ability of a transactional system to make operations in a transaction appear isolated from all other transactions or external operations. While attractive from the perspective of decreasing programming complexity, strict isolation may have some negative implications for transactional-memory systems: e.g., it may prevent interactions between transactions. Such interactions may be useful for several purposes, such as implementing condition synchronization and increasing concurrency. Synchronization techniques that allow such interactions may make it easier to implement increased parallelism within transactions, thereby potentially enhancing system-wide throughput in transactional-memory systems, and may provide a way for some transactions to share modified values of data prior to committing without compromising isolation for other transactions that do not need to share uncommitted data.

SUMMARY

Various embodiments of methods and systems for implementing synchronized objects for software transactional memory are disclosed. According to one embodiment, a system comprises one or more processors and a memory comprising program instructions executable by the processors to implement a transactional-memory manager configured to coordinate memory access requests directed at the memory from a plurality of transactions. The transactions may each comprise a set of operations, e.g., specifying memory locations at an address level, and transaction boundaries may be defined programmatically within application code. The transactional-memory manager may be configured to record, within a collaborator record for a shared data object in the memory, identifications of a set of two or more transactions that have each requested synchronization on the object (e.g., so that each transaction of the set may see uncommitted updates performed on the shared object by other transactions of the set). In response to a commit request from a given transaction of the set, the transactional-memory manager may be configured to determine whether to commit or abort the given transaction based at least in part on the transactional states of other transactions in the set, examining the collaborator record to identify the other transactions. If the transactional-memory manager determines that the given transaction is to be committed based on the states of the other transactions, it may commit the given transaction; otherwise, the given transaction may be aborted, or may have to wait until either the other transactions are all ready to commit or at least one of the other transactions aborts. By requesting synchronization on the shared data objects, the transactions of the set may indicate that isolation requirements (which may typically prevent uncommitted updates from one transaction from being seen by other transactions) be relaxed for the set of transactions and for the object or objects on which synchronization is requested by transactions in the set, thereby potentially allowing increased concurrency and inter-transaction update sharing, without affecting the operations of other transactions that may not need to relax isolation requirements. Part or all of the functionality of the transactional-memory manager may be implemented by a plurality of components in some embodiments, e.g., by the threads that participate in the transactions.

In one embodiment, the transactional-memory manager may also be configured to record, within a respective shared object record for each transaction of the set of transactions, an identification of one or more additional shared data objects on which the corresponding transaction has also requested synchronization. In response to the commit request from the given transaction, the transactional-memory manager may be configured to examine the shared data object record of the given transaction to identify additional shared data objects on which the given transaction has requested synchronization. The determination of whether to commit or abort the given transaction may then also be based on the transactional state of an additional transaction identified from the collaborator record of the additional shared data object. Thus, the set of transactions whose states may be examined in order to determine whether to commit or abort a given transaction may include the collaborator transactions for each of the shared data objects on which the given transaction has synchronized. A transaction T2 may be termed a cohort of another transaction T1 if T2 is either a collaborator of T1 or a collaborator of a cohort of T1. In some embodiments, the set of cohorts of the given transaction may be identified, e.g., by recursively traversing linked shared data object records and collaborator records, and the transactional states of each of the transactions in the cohort set may be examined to determine whether the given transaction is to be aborted or committed. Transactions in a cohort set may either all be committed or all be aborted; e.g., if the transactional-memory manager determines that one transaction requesting commit is to be committed, all the cohorts of that transaction may also be committed; and if the transactional-memory manager determines that one transaction of a cohort set is to be aborted, all transactions of the cohort set may be aborted.

In determining whether to commit or abort a given transaction requesting a commit, the transactional-memory manager may decide to commit if any one of the cohorts of the requesting transaction is already in a committed state, or if each of the cohorts is in a committing state (indicating that the cohort is ready to commit) and has not been aborted. If any of the cohorts is in an aborted state, the given transaction and its cohorts may all be aborted. If a cohort is in an active state, indicating that the cohort has neither indicated that it is ready to commit nor been aborted, the transactional-memory manager may in some embodiments wait until the active transaction has changed state before making the commit/abort decision. If the active cohort aborts, the given transaction may be aborted; if instead the cohort changes to a committing state, the transactional-memory manager may commit the given transaction eventually, if all the other cohorts also reach the committing state. In some embodiments, before a transaction commits, the transaction logically "seals" any objects for which it has requested synchronization, preventing any additional transactions not already identified in the collaborator records of those objects from making changes to the objects. In addition to being used for commits, such a seal may, for example, serve as a delimiter between successive consistent versions of the data of the shared data object: e.g., when a shared data object has been sealed, no further requests for synchronization on the shared data object may be honored until the cohort set linked to the sealed shared data object either commits or aborts.

Figure 1:
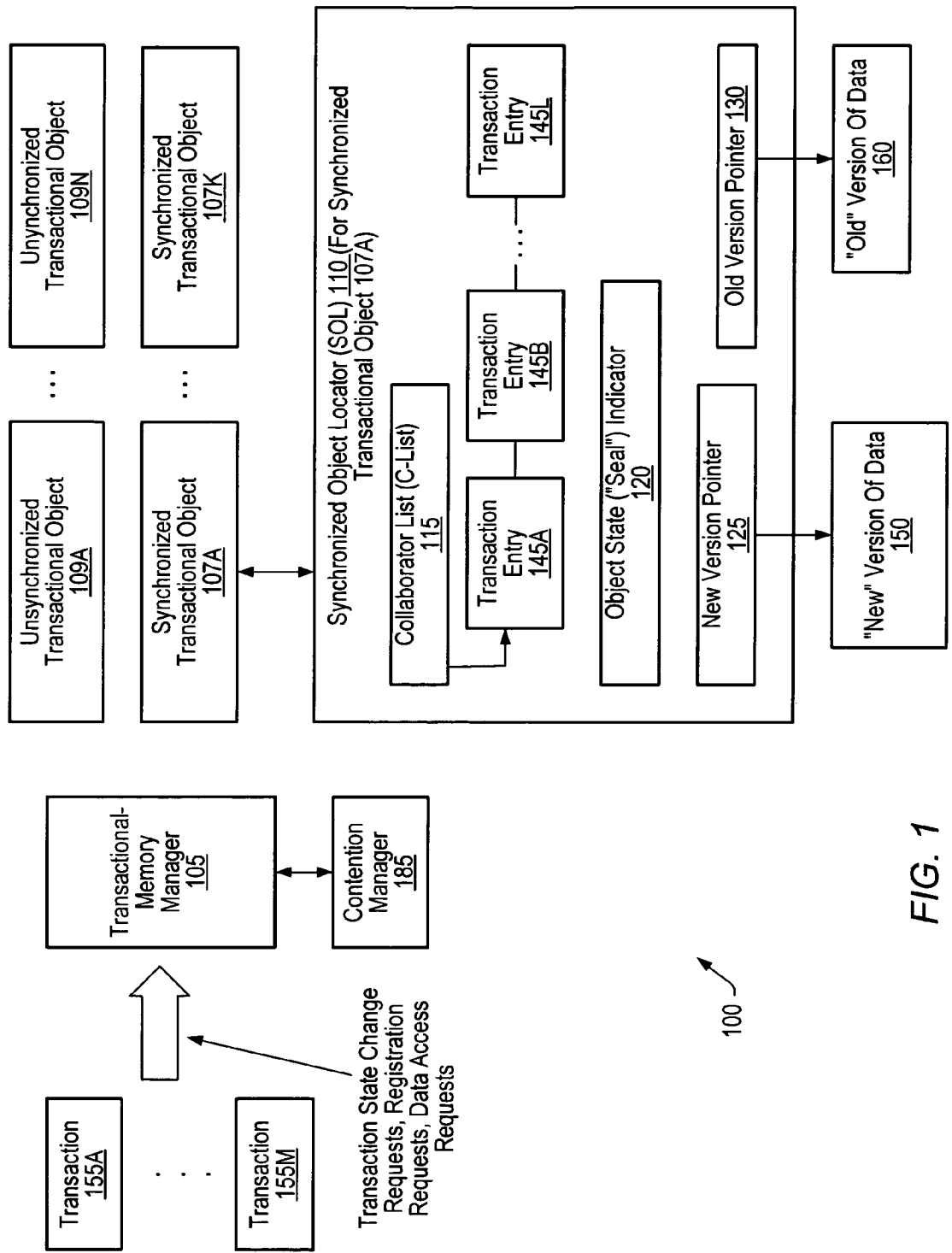
FIG. 1 is a block diagram illustrating one embodiment of a system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

FIG. 1 is a block diagram illustrating one embodiment of a system 100. The system includes a transactional-memory manager 105 configured to coordinate memory access requests directed at transactional objects within a memory from a plurality of transactions 155 (e.g., transactions 155A-155M). A plurality of transactional objects may reside in the memory managed by memory manager 105 at any given time, including unsynchronized transactional objects 109 (e.g., 109A-109N) and synchronized transactional objects 107 (e.g., 107A-107K). The term "transaction", as used herein, may refer to a set of operations performed by one or more threads of execution within a single computer host, such as a multiprocessor host, a single-processor multi-core host that supports multiple concurrent threads of execution, or a uniprocessor host. Each transaction may comprise a plurality of memory accesses (e.g., accesses identifying memory locations at the level of programming language constructs such as Java™ objects, virtual machine addresses or hardware machine addresses) as well as other computations. Transactional-memory manager 105 may in general be configured to ensure, for example, that modifying accesses (e.g., store instructions) to the same memory location by two or more transactions do not result in inconsistent or corrupted versions of the data at that memory location. As shown in FIG. 1, transactional-memory manager 105 may be configured to respond to a variety of different types of requests from transactions 155, including data access requests, state change requests and registration requests; the operation of transactional-memory manager 105 in response to each of these types of requests is described in further detail below.

In order to resolve some types of conflicts between transactions 155, transactional-memory manager 105 may utilize services provided by a contention manager 185, as described below in further detail. It is noted that the term "transaction", as used herein, may in some embodiments refer to lower-level operations than those typically managed by concurrency control algorithms within database management systems (although even in such embodiments, low-level operations of threads of a database management system process may be coordinated using a transactional-memory manager 105). In other embodiments, the techniques described herein may also or instead be used to manage concurrent database transactions. In some embodiments, transactional-memory manager 105 may be implemented entirely in application or user space, while in other embodiments, portions or all of transactional-memory manager 105 may be embedded within a virtual machine process (e.g., a Java™ virtual machine (JVM)) and/or within an operating system (which may be configured to implement virtual memory). In one embodiment, transactional-memory manager 105 may be deployed as a shared library (e.g., within one or more Java™ archive or "jar" files at a JVM). Transactional-memory manager 105 may rely on atomic operation support provided by an underlying operating system or virtual machine implementation in some embodiments, e.g., to atomically change transaction state. Part or all of the functionality of the transactional-memory manager 105 may be implemented by a plurality of components in some embodiments, e.g., by the threads that participate in the transactions.

The term "transactional object", as used herein, may refer to an object that contains or encapsulates an ordinary object that may be declared or defined in a programming language (e.g., any cloneable object defined in the Java™ programming language may be encapsulated in some embodiments). The encapsulation of the ordinary object within a transactional object may allow transactional-memory manager 105 to support concurrent programming without the use of locks, as described below in further detail. A transactional object may be designated as either unsynchronized or synchronized, e.g., using programming language declarations. In one implementation utilizing an object-oriented language such as the Java™ programming language, for example, a transactional object that is unsynchronized may be declared as an instance of a TMObject class, and a synchronized transactional object may be declared as an instance of a TMSynchronizer class that is a subclass of the TMObject class. The term "unsynchronized object" and "unsynchronized transactional object" may be used synonymously herein, and the terms "synchronized object" and "synchronized transactional object" may also be used synonymously herein. Modifications made to the ordinary object encapsulated within an unsynchronized object 109 by a transaction 155 may not be visible to other transactions until the modifying transaction commits. Modifications made to the ordinary object encapsulated within a synchronized object 107 by a transaction 155 that has registered for synchronization on the synchronized object may be visible, prior to the modifying transaction's commit, only to other transactions that have also registered for synchronization on the same synchronized object 107. Thus, some transactions 155 may share updated data with other transactions prior to committing, thereby relaxing the isolation requirement typical of transactional systems; other transactions may restrict their updates to unsynchronized transactional objects 109, and thus maintain strict isolation. It is noted that while the isolation requirement may be relaxed for transactions that access synchronized transactional objects 107, the atomicity requirement may not be relaxed. All transactions 155 are atomic: a transaction is either committed (i.e., its changes are made permanent) or aborted (its changes are discarded).

Transactional-memory manager 105 may be configured to provide a low-level application programming interface (API) to support coordination of accesses to shared data without using locks in some embodiments. For example, a beginTransaction( ) interface may be provided to allow programmatic indication of the initiation of a transaction 155, and a commitTransaction( ) interface may be provided to allow programmatic indication of a request to commit a transaction 155 (i.e., to make permanent any data modifications—performed between the invocations of the beginTransaction( ) and commitTransaction( ) interfaces). Transactional-memory manager 105 may in some embodiments provide different interfaces to allow access to unsynchronized and synchronized objects 109 and 107 respectively: e.g., in one implementation, an open( ) interface may be used to request access to unsynchronized objects 109, and a synchronize( ) interface may be used to request (synchronized) access to synchronized objects 107. In some embodiments, a single interface (such as synchronize( )) to access a synchronized object 107 may serve two logically distinct purposes: first, the requesting transaction 155 may be registered as a synchronizing transaction with respect to the object 107, and second, a pointer to the encapsulated data of the synchronized object 107 may be returned to the requesting transaction 155. In some embodiments, separate interfaces may be provided for registration and for obtaining access to the encapsulated data. In order to ensure that the relaxation of the isolation requirement does not lead to inconsistent data or incorrect operations, all the transactions 155 that synchronize concurrently on a given synchronized object 107 are either committed, or all are aborted. Further details on how the set of transactions that are to be committed or aborted together is enumerated, and how it is determined whether to commit or abort the set, are provided below. In some embodiments, one or more of the transactions that synchronize on a synchronized object 107 may not actually modify the encapsulated data of the synchronized object; in some such cases, for example, a synchronized object 107 may serve simply as a barrier synchronization mechanism without requiring any uncommitted updates to be shared across transactions. In one embodiment from among a set of transactions 155 that have synchronized on a given object 107, one or more transactions may modify the encapsulated object, and one or more other transactions may read the uncommitted modifications to the object (thus implementing, for example, a producer-consumer buffer). It is noted that in embodiments where multiple transactions modify the encapsulated object, the modifying transactions may implement a protocol (e.g., a locking protocol) to ensure that they do not make inconsistent modifications to the encapsulated object. In some such embodiments, transactional-memory manager 105 may implement or participate in such a protocol, and in other embodiments the protocol may be implemented independently of transactional-memory manager 105.

A given transaction 155 may access one or more unsynchronized objects 109, one or more synchronized objects 107, or a combination of synchronized and unsynchronized transactional objects in various embodiments. Transactions that register to synchronize on at least one synchronized object 107 may be termed "synchronizing" transactions herein, and transactions that do not attempt to register for any synchronized objects 107 may be termed "nonsynchronizing" transactions. At any given time, the set of transactions that are active in system 100 may include any combination of non-synchronizing and synchronizing transactions (e.g., only nonsynchronizing transactions, only synchronizing transactions, or both nonsynchronizing transactions and synchronizing transactions). Transactional-memory manager 105 may be configured to manage interactions and conflicts among the nonsynchronizing and synchronizing transactions.

Figure 2:
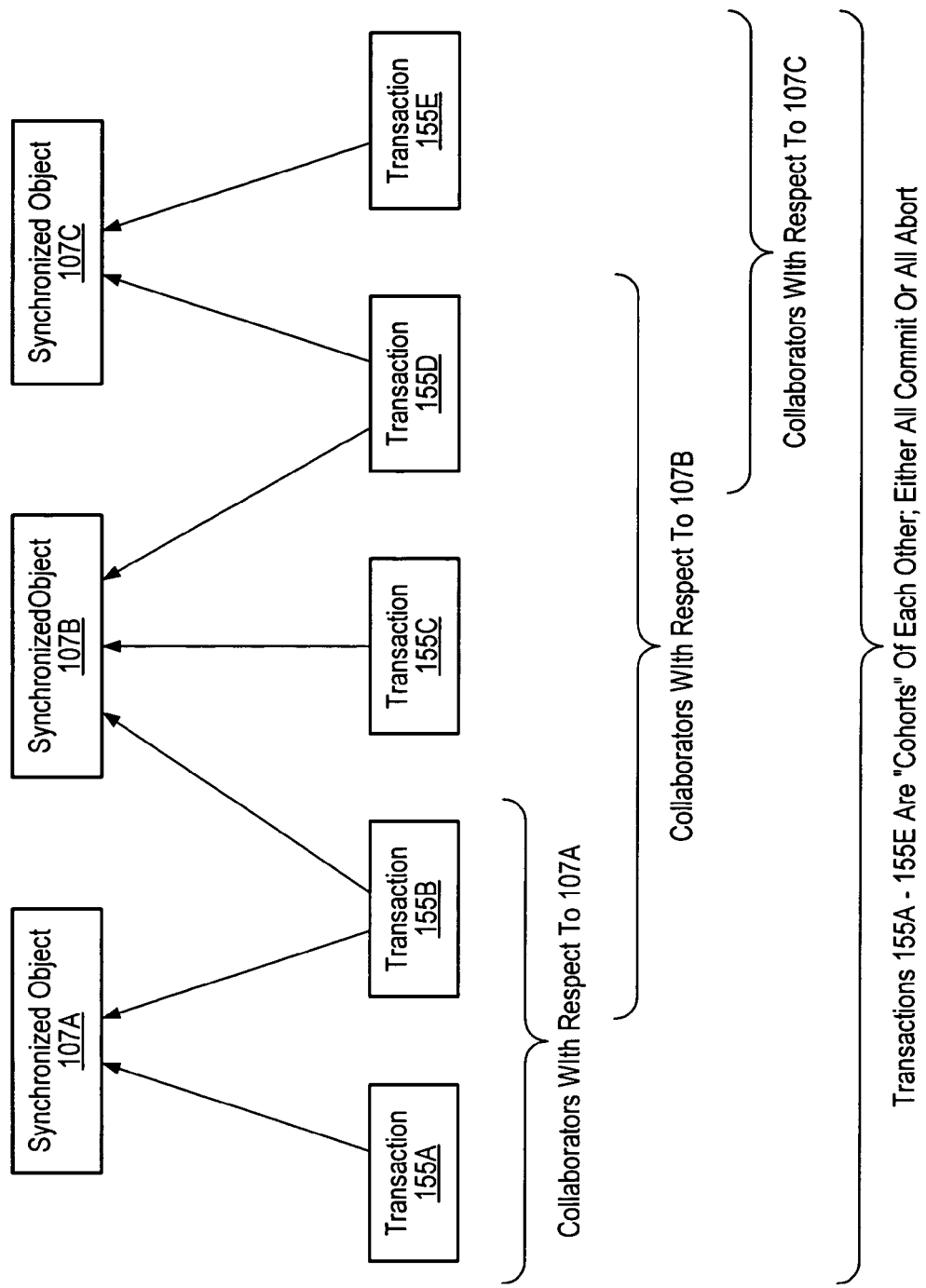
FIG. 2 is a block diagram illustrating collaborator and cohort relationships among a set of transactions, according to one embodiment.
Figure 3:
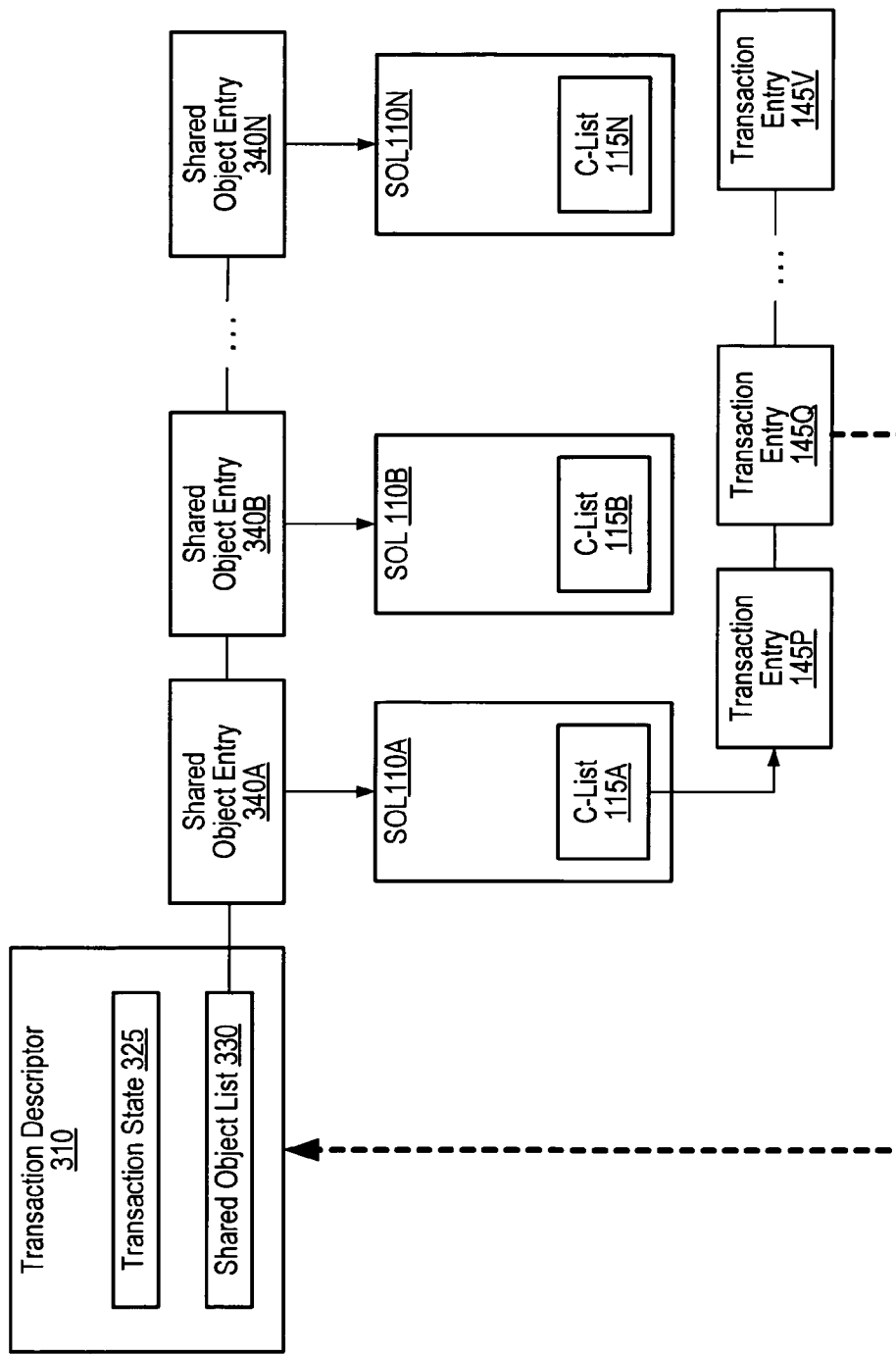
FIG. 3 is a block diagram illustrating a shared object list that may be maintained for each transaction, according to one embodiment.

In one embodiment, transactional-memory manager 105 may be configured to implement a synchronized object 107 using a data structure termed a synchronized object locator (SOL) 110. (FIG. 1 shows an SOL 110 for synchronized object 107A; similar SOLs 110 may be maintained for each of the other synchronized objects 107B-107K, but are not shown in FIG. 1 for clarity.) In one embodiment, synchronized object 107 may comprise a reference or pointer to the corresponding SOL 110. An SOL 110 may comprise a collaborator record, such as collaborator list (C-List) 115, identifying the transactions 155 that have registered to synchronize on the corresponding object 107. For example, C-List 115 for object 107A in FIG. 1 comprises transaction entries 145A-145L, each transaction entry identifying a different transaction 155 that has synchronized on object 107A. In response to a registration request from a transaction 155 to synchronize on the object 107, transactional-memory manager 105 may be configured to add a transaction entry 145 to the C-List 115. For each transaction 155, a transaction state indicator may be maintained (e.g., within a respective transaction entry 145, and/or in a transaction descriptor 310 as shown in FIG. 3), indicating, for example, whether the transaction is active (not yet ready to commit), aborted, committed, or ready to commit. In response to a request to commit received from one of the transactions on the C-List 115, the transactional-memory manager 105 may be configured to determine whether to commit or abort the requesting transaction based at least in part on the transactional states of other transactions on the C-List 115. (The transactional states of other transactions that may not necessarily all be identified in a single C-List 115 may also be taken into account in some embodiments in making the commit/abort decision, as described below in conjunction with the descriptions of FIG. 2, FIG. 3, and FIG. 10.) For example, in one embodiment, if any one of the transactions identified in the C-List 115 is in an aborted state, the requesting transaction and all other transactions in the C-List 115 may be aborted, and if any one of the transactions identified in the C-List 115 is in a committed state, the requesting transaction and all the other uncommitted transactions in the C-List 115 may be committed. C-Lists 115 may be implemented using a variety of techniques in different embodiments, e.g., as linked lists, arrays, circular logs, etc.

It is noted that locator objects similar in concept to SOLs may also be used to implement unsynchronized objects 109 in some embodiments; however, since only a single transaction 155 may be allowed to modify an unsynchronized object 109 at a time, the locator objects of unsynchronized objects may only need to identify a single "opener" transaction that most recently opened the unsynchronized object for access. In some embodiments, e.g., to simplify implementation, SOLs 110 may also be used for unsynchronized objects 109; in such an embodiment, a C-List 115 for an unsynchronized object 109 may not need to include more than one transaction entry 145.

In addition to the C-List 115, an SOL 110 may also comprise an object state indicator 120 (which may also be termed a "seal" indicator herein), that may be used, for example, to ensure that additional transactions do not succeed in registering for object 107 (and thereby potentially changing the encapsulated data of object 107) after one of the transactions issues a commit request. A "seal" may be placed on a synchronized object 107 (e.g., by setting object state indicator 120 to a particular value) to act as a delimiter between different consistent versions of the encapsulated data; a transaction 155 that has synchronized on an object 107 may be required to seal the object (or to ensure that the object 107 has been sealed by another collaborating transaction) before it commits. After an object 107 has been sealed, the modifications made by the transactions in the C-List 115 of that object may not be visible to any other transaction until the transactions on the C-List 115 all commit. In some implementations, the object state indicator may be implemented as a special entry in a C-List 115. For example, in one implementation, the C-List may be implemented as an ordered list of records, and to seal a synchronized object 107, a seal record may be placed at the head of the C-List when a transaction from among the transactions identified in the C-List 115 issues a commit request and the synchronized object is not already sealed.

In some embodiments, two or more versions of the encapsulated data of the synchronized object 107 may be maintained, such as an "old" version 160 and a "new" version 150, as shown in FIG. 1, and SOL 110 may include respective pointers 130 and 125 to the old and new versions respectively. The old version 160 may, at a given point in time, comprise a committed version of the data, and the new version may include uncommitted modifications made by one or more registered transactions 155. When a transaction sends a registration request for a synchronized object 107 to transactional-memory manager 105 (e.g., by invoking a synchronize( ) interface), and the synchronized object is currently sealed, the requesting transaction may have to wait until the current set of collaborating transactions on object 107 (i.e., the transactions identified in the C-List 115 of the object 107) either commit or abort and the object 107 is thereby "unsealed". After the unsealing, a new SOL object 110 may be allocated and passed to the requesting transaction, with the C-List 115 of the new SOL object comprising only the requesting transaction. If the object 107 was unsealed as a result of a commit, the new version 150 of the previous SOL 110's data may be cloned, and the data pointers 125 and 130 of the new SOL 110 may be appropriately adjusted so that the newly registered transaction 155 sees the committed changes. If the object 107 was unsealed as a result of an abort, the old version 160 of the previous SOL 110's data may be cloned, and the data pointers of the new SOL 110 may be appropriately adjusted so that the newly registered transaction 155 does not see the uncommitted changes of the now-aborted transactions. Further details of the techniques used to respond to synchronization request after a synchronized object 107 is "sealed", and the manner in which data pointers 125 and 130 may be manipulated in various embodiments are provided below in conjunction with the descriptions of FIG. 6, FIG. 7, and FIG. 8. When a transaction 155 successfully registers for a synchronized object 107 (e.g., when the transaction is placed on the C-List of the object), pointer 125 (i.e., a pointer to the new version of the data) may be returned to the transaction, and the registered transaction may then read and/or modify the new version of the data 150. However, as in other software transactional-memory schemes, no external references to the new data 150 may be created; all references to the encapsulated data are handled through the SOL 110 and its pointers, since the new version 150 is to be accessible only to transactions that have registered for synchronized object 107 until these transactions commit. It is noted that the organization of an SOL 110 may differ from that shown in FIG. 1 in some embodiments, e.g., one or more other fields comprising data access timestamps and/or statistical data may be included, or, in embodiments where each transaction has an associated priority, a field indicating the highest priority transaction among the transactions in the C-List 115 may be included in the SOL 110.

The transactions 155 identified in a given C-List 115 may be referred to herein as "collaborators" or "collaborating transactions" with respect to the corresponding synchronized object 107. In some embodiments, a transaction 155 may register to synchronize on more than one synchronized object 107, each of which may have its own C-List 115. As noted above, collaborators of a given synchronized object 107 are not isolated from one another, since they can see each other's uncommitted changes to the encapsulated data. If a transaction 155A aborts, then 155A's collaborators must also be aborted to prevent the observation of partial effects of the aborted transaction by noncollaborating transactions. This implies that collaborators of 155A's collaborators should also be aborted. For any given transaction 155, the term "cohort" may be used herein to refer to another transaction that is either a collaborator of the transaction 155, or a collaborator of a cohort of transaction 155. (In terms of formal mathematics, the cohort relationship may be an equivalence relation, i.e., it may be reflexive, symmetric and transitive.) FIG. 2 is a block diagram illustrating collaborator and cohort relationships among a set of transactions 155, according to one embodiment. Transactions 155A and 155B may be collaborators with respect to synchronized object 107A; e.g., both 155A and 155B may be identified in a C-List 115 of the SOL 110 of object 107A. Similarly, transactions 155B, 155C and 155D may be collaborators with respect to synchronized object 107B, and transactions 155D and 155E may be collaborators with respect to synchronized object 107C. All the transactions shown in FIG. 2 are cohorts of each other. If, for example, transaction 155A aborts, then, because uncommitted changes to the data encapsulated by object 107A may have been seen by transaction 155B, transaction 155B must be aborted. If transaction 155B is aborted, transactions 155C and 155D must be aborted, because the latter two transactions may have seen uncommitted changes from transaction 155B; similarly, if transaction 155D is aborted, transaction 155E must also be aborted. In addition, none of the cohorts 155A-155E in FIG. 2 should be committed if there is a chance that any of the other cohorts may still abort. For example, if transaction 155A commits, and then transaction 155C is allowed to abort, transaction 155B "must" both abort (to ensure that the uncommitted changes of 155C are not seen externally) and commit (because changes made by 155B to data encapsulated by object 107A may have been made permanent by the commit of transaction 155A), which is a logical impossibility. Therefore, either all the cohorts 155A-155E must commit, or all must abort. The transactions that are cohorts of each other at a given point in time may be termed a "cohort set" herein, and the synchronized objects 107 with respect to which the transactions are cohorts may be termed a "synchronized object set" herein. In the embodiments depicted in FIG. 1 and FIG. 2, once a transaction synchronizes on an object 107, it joins a cohort set linked by relationships similar to those shown in FIG. 2, and it remains part of that cohort set until it either commits or aborts. Cohort sets may expand over time, e.g., as more transactions register to synchronize on one of the objects of the synchronized object set. It is noted that in some embodiments where features such as the "unsynchronize( )" method described below are implemented, cohort sets may also shrink over time; in other embodiments, cohort sets may not shrink until the cohorts terminate by committing or aborting.

Transactional-memory manager 105 may be configured to identify the set of cohorts of any given synchronizing transaction 155 that requests a commit in some embodiments. As described below in further detail, in many cases transactional-memory manager 105 may not need to identify the complete cohort set before making a commit/abort decision (e.g., as soon as a cohort in an aborted state is found, the enumeration of additional cohorts may no longer be needed); however, in principle at least, the entire cohort set of a transaction may have to enumerated. FIG. 3 is a block diagram illustrating a shared object list 330 that may be maintained for each synchronizing transaction 155, according to one embodiment, for example to be used by transactional-memory manager 105 in identifying the transaction's cohort set. A transaction 155 may be represented by a transaction descriptor 310, which may in turn comprise a transaction state indicator 325 and a shared object list 330. The shared object list 330 may comprise a collection of shared object entries 340, where each shared object entry identifies or points to an SOL 110 for a synchronized object 107 for which the transaction represented by transaction descriptor 310 has registered. In some implementations, the shared object list 330 may comprise the SOLs 110, without using intermediary shared object entries 340. In turn, the C-Lists 115 of each SOL 110 identified in the shared object list 330 may identify the collaborators for the corresponding synchronized object 107. For example, transaction entry 145Q of C-List 115A in FIG. 3 points to transaction descriptor 310, indicating that the transaction represented by transaction descriptor 310 is a collaborator with respect to SOL 110A. (To avoid clutter, C-Lists of other SOLs 110 are not shown in FIG. 3.) In some implementations, C-Lists 115 may comprise transaction descriptors 310, instead of using intermediary transaction entries 145. The combination of shared object lists 330 and C-Lists 115 may support a mechanism to identify the cohort set of a given transaction, or all the cohorts associated with any given synchronized object 107. For example, in order to determine the current cohort set of a given transaction 155, transactional-memory manager 105 may be configured to traverse the shared object list 330 for that transaction, and for each SOL 110 identified in the shared object list, include all the transactions in that SOL's C-List 115 in the cohort set, and recursively traverse the shared object lists of all those transactions. In order to determine the cohorts associated with a given synchronized object 107, the transactional-memory manager may start from the SOL 110 for the object 107, traverse its C-List 115 to identify the collaborators on that object 107, add the collaborators to the cohort set, and then for each collaborator, recursively traverse its shared object list 330. It is noted that in practice, especially in embodiments where transactions 155 are relatively short lived and/or where the number of objects 107 on which each transaction synchronizes is on average relatively small, C-Lists and shared object lists may typically be relatively short, so the recursive traversals of these lists may be fairly inexpensive.

Figure 4:
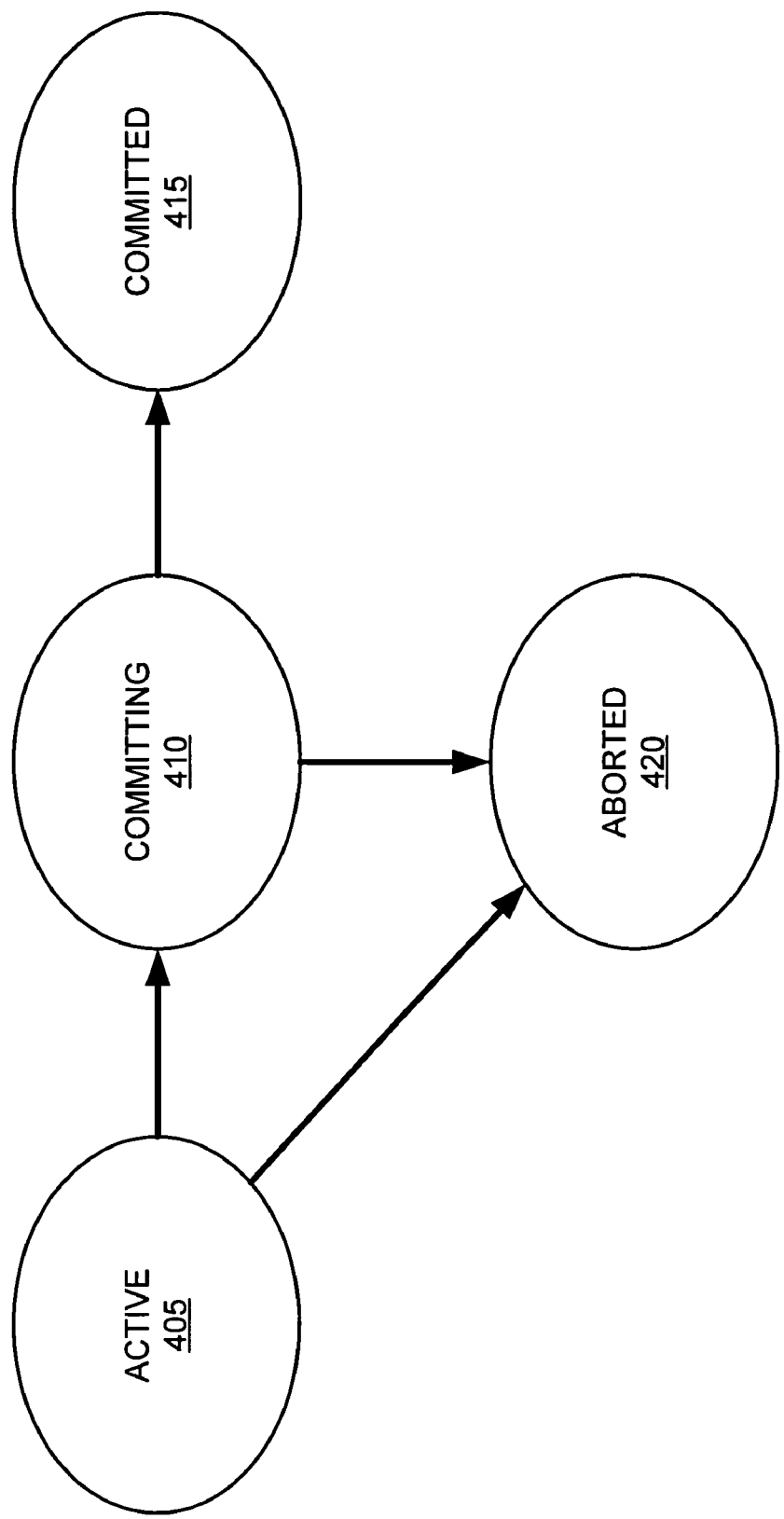
FIG. 4 is a state transition diagram illustrating the possible states of a synchronizing transaction, according to one embodiment.

Transactional state information may be maintained for each transaction, e.g., in state indicator 325 within the corresponding transaction descriptor 310. FIG. 4 is a state transition diagram illustrating the possible states of a synchronizing transaction 155 (i.e., a transaction that synchronizes on at least one synchronized object 107), according to one embodiment. When a transaction starts, it enters the ACTIVE state 405. In some embodiments, for example, an invocation of a beginTransaction( ) interface by a thread of execution may result in an atomic allocation of a transaction descriptor 310 with an empty shared object list 330 and a state indicator set to indicate the ACTIVE state. While in the ACTIVE state 405, the transaction may perform various computations and memory accesses, and may, for example, register for synchronized access to one or more synchronized objects 107, e.g., by invoking a synchronize( ) interface. When a transaction in the ACTIVE state has completed its data accesses and computations, it may atomically change state to the COMMITTING state 410, indicating that it is ready to commit any modifications it has made. In some embodiments, transactional-memory manager 105 may provide a specific API for the transition between ACTIVE and COMMITTING states, e.g., a readyToCommit( ) interface, while in other embodiments, an invocation of a commitTransaction( ) interface may result in the transaction being placed in the COMMITTING state and in an initiation of other operations needed to actually commit the transaction. The transactional-memory manager 105 may determine whether the transaction is to be committed or has to be aborted, e.g., based at least in part on the states of one or more cohorts of the COMMITTING transaction. If the transactional-memory manager 105 determines that the transaction is to be committed, it may commit the transaction and the transaction's state may be changed to the COMMITTED state 415. If the transactional-memory manager determines that the transaction is to be aborted, it may abort the transaction and the transaction's state may change from the COMMITTING state to the ABORTED state 420. In addition, a transaction in the ACTIVE state 405 may also be aborted (e.g., when a cohort attempts to "seal" a synchronized object 107, as described below, or when transactional-memory manager 105 detects a conflict between the ACTIVE transaction and another transaction that is not a cohort of the ACTIVE transaction).

It is noted that in some embodiments, a simpler set of state transitions may be implemented for nonsynchronizing transactions 155 (i.e., transactions 155 that do not synchronize on any synchronized objects 107). The COMMITTING state may not be required for such transactions in some embodiments, since nonsynchronizing transactions may not need to wait for any other transactions before being committed/aborted. Thus, nonsynchronizing transactions may change state atomically from the ACTIVE state to the COMMITTED state or from the ACTIVE state to the ABORTED state in such embodiments.

Figure 5:
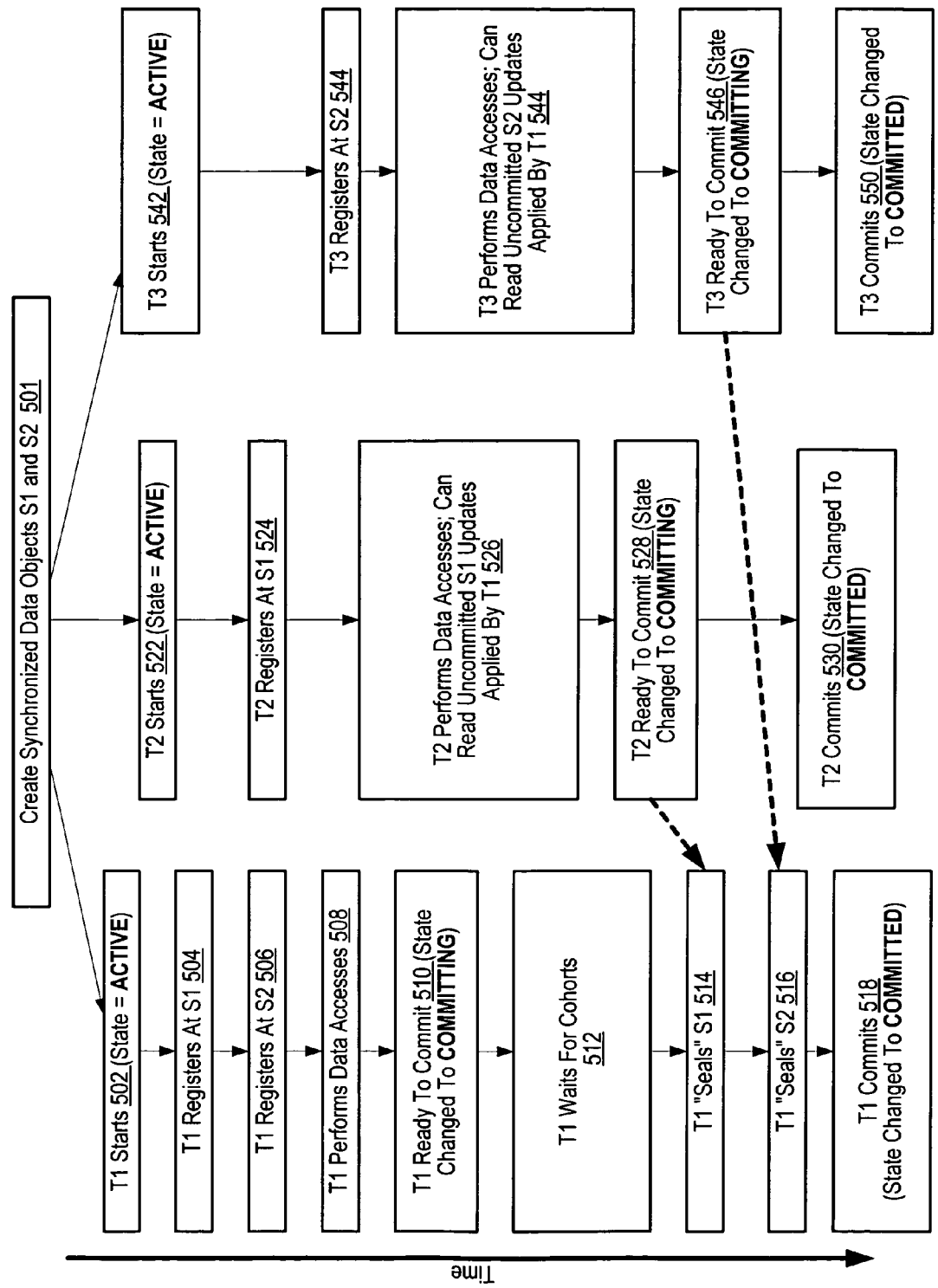
FIG. 5 is a block diagram illustrating a time sequence of operations at three synchronizing transactions, according to one embodiment.

FIG. 5 is a block diagram illustrating a time sequence of operations at three synchronizing transactions T1, T2 and T3, according to one embodiment. Events are ordered in time from top to bottom in FIG. 5, as indicated by the arrow labeled "Time" at the left. Prior to the start of any of the transactions, synchronized objects S1 and S2 may be initialized or created (block 501). For example, in one embodiment where the Java™ programming language is used to implement the application of which transactions 155 form a part, a TMSynchronizer class may be defined to implement synchronized objects 107, and the data object that is to be encapsulated within the synchronized object may be passed as a parameter to a constructor used to instantiate a TMSynchronizer object. If an object representing a travel itinerary (which may be termed a TravelItinerary object) is to be shared among several synchronizing transactions in such an example, the travel itinerary object may be first created, and then passed to a TMSynchronizer object, as shown below:

TravelItinerary ti=new TravelItinerary( ); // create new instance of travel itinerary object
TMSynchronizer S1=new TMSynchronizer(ti); // create new instance of encapsulating // synchronized object Similarly, synchronized object S2 may be created to encapsulate and provide synchronized access to another object. In some embodiments, the encapsulated object (e.g., "ti" in the above code example) may be required to be "cloneable" (i.e., the underlying programming language may be required to provide support for duplication or cloning of the encapsulated object). In some implementations, the ability to atomically duplicate the object may be needed to manage the new version 150 and old version 160 of the encapsulated object's data during commits and aborts. After synchronized objects S1 and S2 have been created, transaction T1 may be started (block 502), e.g., by a thread invoking a beginTransaction( ) API. T1 may enter the ACTIVE state in block 502. T1 may subsequently register to synchronize on S1 (block 504) and S2 (block 506). Meanwhile, transaction T2 may start (block 522) and register for synchronization on S1 (block 524), thus becoming a collaborator of T1 with respect to S1. Similarly, transaction T3 may start (block 542) and may register as a collaborator of T1 with respect to S2 (block 544). Thus, T1, T2 and T3 may form a cohort set with respect to S1 and S2. Each of the transactions T1, T2 and T3 may begin independently of the others, and may register for synchronization at desired synchronized objects independently of the others.

Each transaction may then perform data accesses on the synchronized objects (and on any other objects accessed within the scope of the respective transactions). When T1's data accesses (block 508) complete, T1 may be ready to commit (block 510), and may, for example, atomically change state from ACTIVE to COMMITTING, e.g., by invoking a commitTransaction( ) API. Meanwhile, T2 may still be performing its data accesses and computations (block 526), and may still have access to as-yet-uncommitted changes to S1 made by T1. Also, T3 may still be performing its data accesses and computations (block 544), and may be able to read uncommitted changes to S2 performed by T1. T1 may have to wait for its cohorts T2 and T3 to complete their operations and enter the COMMITTING state (block 512) before T1 commits. When T2 changes to the COMMITTING state (block 528), T1 may "seal" S1 (block 514) (e.g., by modifying object state indicator 120 for S1), indicating that no other transactions are to be allowed to synchronize on S1 until T1 and T2 commit or abort. (The dotted arrow from block 528 to block 514 indicates the dependency of T1 on T2's reaching the COMMITTING state before T1 may seal S1.) Similarly, when T3 changes to the COMMITTING state (block 546), T1 may "seal" S2 (block 516). Having sealed all the synchronized objects 107 for which it is registered (i.e., S1 and S2), T1 may change from the COMMITTING state to the COMMITTED state, indicating a successful commit operation (518). In some embodiments, e.g., a value indicating success may be returned to T1 from the commitTransaction( ) call to indicate the change to the COMMITTED state. T2 and T3 may also be committed (i.e., they may change state to the COMMITTED state) (blocks 530 and 550 respectively). It is noted that while in the depicted time sequence shown in FIG. 5, the cohorts are committed, all the cohorts may instead have aborted if any one of them aborted after all three had registered. It is also noted that while T1 seals S1 and S2 in the specific example illustrated in FIG. 5, it is also possible for either T2 or T3 to seal either S1 or S2 after reaching the COMMITTING state. In one embodiment, transactional-memory manager 105 may guarantee that an attempt to seal an object fails only if either (a) another cohort has already successfully sealed the object or (b) a new transaction has registered for the object since the attempt to seal the object was made.

It is noted that in some embodiments, the "sealing" of a synchronized object 107 by T1 may be performed at a different time relative to the waiting operations of block 512. For example, in the depicted embodiment, if a transaction T4 attempts to register for S1 (or S2) after T1 enters the COMMITTING state in block 510, and before T2 or T3 enter the COMMITTING state, T4 may be allowed to successfully register, and may be included in the C-List 115 for S1 (or S2). T1 may then have to wait for T4 to also enter the COMMIT- TING state before S1 (or S2) is sealed, thus potentially lengthening the time window in which other transactions T5, T6, etc. may also join the cohort set. In another embodiment, T1 may instead seal S1 and S2 as soon as T1 enters the COMMITTING state, while T2 and T3 are still in the ACTIVE state (e.g., operations of block 514 and 516 may be performed prior to the wait of block 512). By sealing objects S1 and S2 early, T1 may reduce the time that it may have to wait for cohorts; however, new transactions that request registration for S1 or S2 may have to wait longer to register (since they may have to wait until the objects are unsealed). In some embodiments, the sealing operation may be independent of, and performed prior to, any transaction's being ready to commit. For example, an API specifically for sealing (e.g., setSeal( )) may be supported in some embodiments, allowing a transaction 155 to "freeze" the cohort set at any time after the transaction 155 registers, e.g., by preventing any additional transactions from registering until the initiator of the freeze commits or aborts.

In one example use case, transactions such as T1, T2 and T3 of FIG. 5 may represent concurrent threads of a travel reservation application. A user of the travel reservation application may, for example, wish to make an airline reservation, a car reservation, and a hotel reservation. If all three reservations were made within a single transaction in a typical transactional-memory implementation, the three reservations would be made in sequence, even though there may be no requirement for sequentiality. Instead, in an environment where transactional-memory manager 105 supports synchronization on shared data objects as described above, each of the three reservations may be performed by a different transaction. For example, T1 may be responsible for the airline reservation, T2 may be responsible for making the car reservation, and T3 may be responsible for making the hotel reservation. If any of the three reservations fail (e.g., if either T1, T2 or T3 fails or aborts), the entire reservation set fails (T1, T2 and T3 all abort); if all three reservations succeed (T1, T2 and T3 commit), the user's combined request succeeds. In some cases, none of the reservation transactions may actually modify any data of Si or S2; they may all simply register for synchronization on S1 or S2 and wait for all to commit/abort together, implementing a simple barrier synchronization mechanism. It is noted that even barrier synchronization mechanisms may need to modify some data to record which (or how many) transactions have arrived at the barrier, and S1 and/or S2 may be used for such records in embodiments where such records are not provided direct support by the transactional system. In other cases, updated information may be passed from one cohort to another via S1 or S2: e.g., if a range of acceptable dates or flight times were specified by the requesting user, an airline reservation transaction T1 may indicate via an updated field of S1 the specific flight time selected, and this information may be used by a car reservation transaction T2 and/or a hotel reservation transaction T3.

Figure 6:
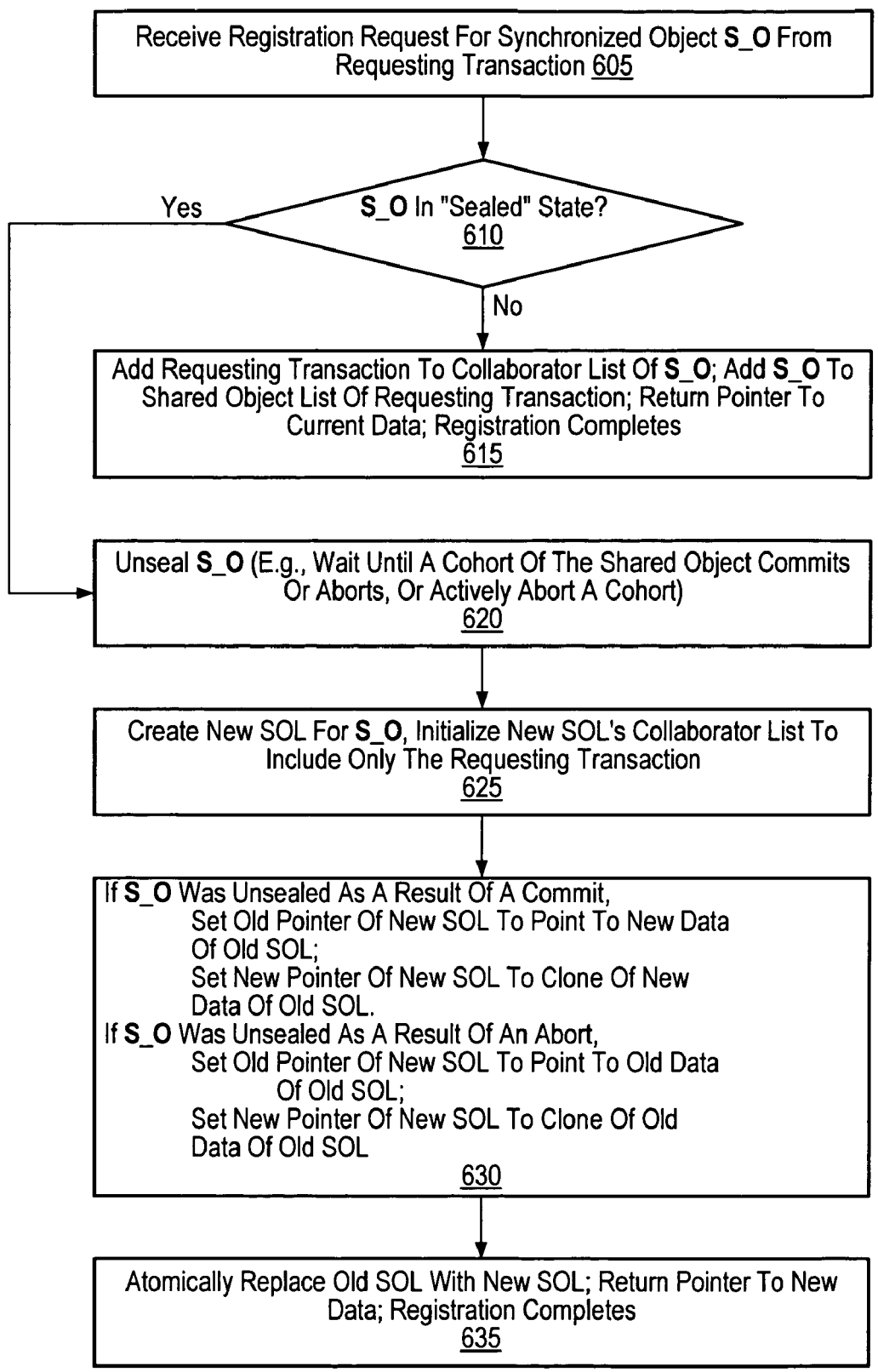
FIG. 6 is a flow diagram illustrating aspects of the operation of a transactional-memory manager in response to a registration request for a synchronized object from a transaction, according to one embodiment.

FIG. 6 is a flow diagram illustrating aspects of the operation of transactional-memory manager 105 in response to a registration request (e.g., a synchronize( ) call) for a synchronized object 107 from a transaction 155, according to one embodiment. In the depicted embodiment, the registration request serves both to register the requesting transaction 155 in a collaborator record or C-List 115, and to return a current version of an SOL 110 for the object 107 to the requesting transaction. The transactional-memory manager receives the registration request (block 605) identifying the specific synchronized object 107 from the requesting transaction. If the synchronized object is not sealed (which may be detected, e.g., from object state indicator 120 in the SOL 110 for the object 107 in block 610 of FIG. 6), a transaction entry 145 for the requesting transaction 155 may be added to the current C-List 115 for the object 107 (block 615). In addition, an entry for the object 107 may be added to the requesting transaction's shared object list 330, and a pointer to the current version of the data object (e.g., new version 150) may be returned to the requesting transaction. The registration may be deemed to be complete at this point, and a success indicator may be returned to requesting transaction 155 in some embodiments.

If, on the other hand, the object 107 was already in a sealed state when the registration request is received (as detected in block 610), the transactional-memory manager 105 may be configured to unseal the object 107 (block 620), e.g., either by waiting until the cohorts associated with the object 107 commit/abort, or by actively aborting the cohorts. Unsealing operations corresponding to block 620 of FIG. 6 are described in further detail below in conjunction with the description of FIG. 9. Whether the unsealing comprises only waiting, a combination of waiting followed by an eventual abort, an immediate active abort, or some other action, may be determined based on a variety of factors in different embodiments. For example, in some embodiments, a configurable parameter indicating a "maximum unseal waiting time" may be provided to transactional-memory manager 105, and after waiting for the specified maximum time, the transactional-memory manager 105 may abort a cohort to unseal the object 107. In other embodiments, each transaction 155 may have an associated priority, and transactional-memory manager 105 may be configured to abort a cohort if the requesting transaction has a higher priority than some or all of the cohorts. In one embodiment, transactional-memory manager 105 may be configured to maintain statistics on the number of aborts and commits, and make the decision on whether to wait or abort based on a heuristic derived from the statistics. Other techniques to determine how to respond to a registration request after the targeted synchronized object is sealed may also be used in various embodiments.

The object 107 for which the registration request was received may eventually be unsealed, either as a result of a commit by one or more cohorts, or as a result of an abort by one or more cohorts. In some embodiments, the object 107 may remain sealed until all the cohorts' states change to the COMMITTED state or the ABORTED state, while in other embodiments, the object may be unsealed as soon as any one of the cohorts' state changes to the COMMITTED state or the ABORTED state. In one specific embodiment, the object 107 may be unsealed as soon as it becomes evident that the cohorts are going to be committed/aborted—e.g., a cohort may be deemed to be "logically committed" or "effectively committed" if all its cohorts are in the COMMITTING state and all the synchronized objects 107 of the cohort set are sealed, and the object may be unsealed as soon as a cohort is found to be effectively committed. When the commit/abort occurs, the object state indicator 120 of the SOL 110 for the object 107 may be updated to reflect the unsealed state.

A new SOL 110 may be created for the requesting transaction after the object 107 is unsealed (block 625), e.g., with a C-List 115 that identifies only the requesting transaction. The new and old data pointers 125 and 130 (shown in FIG. 1) of the newly constructed SOL may be set to point to the appropriate versions of the data of the encapsulated object (block 630). The pointer operations may differ based on whether the unsealing occurred as a result of a commit or an abort, as illustrated in FIG. 7 and FIG. 8.

Figure 7:
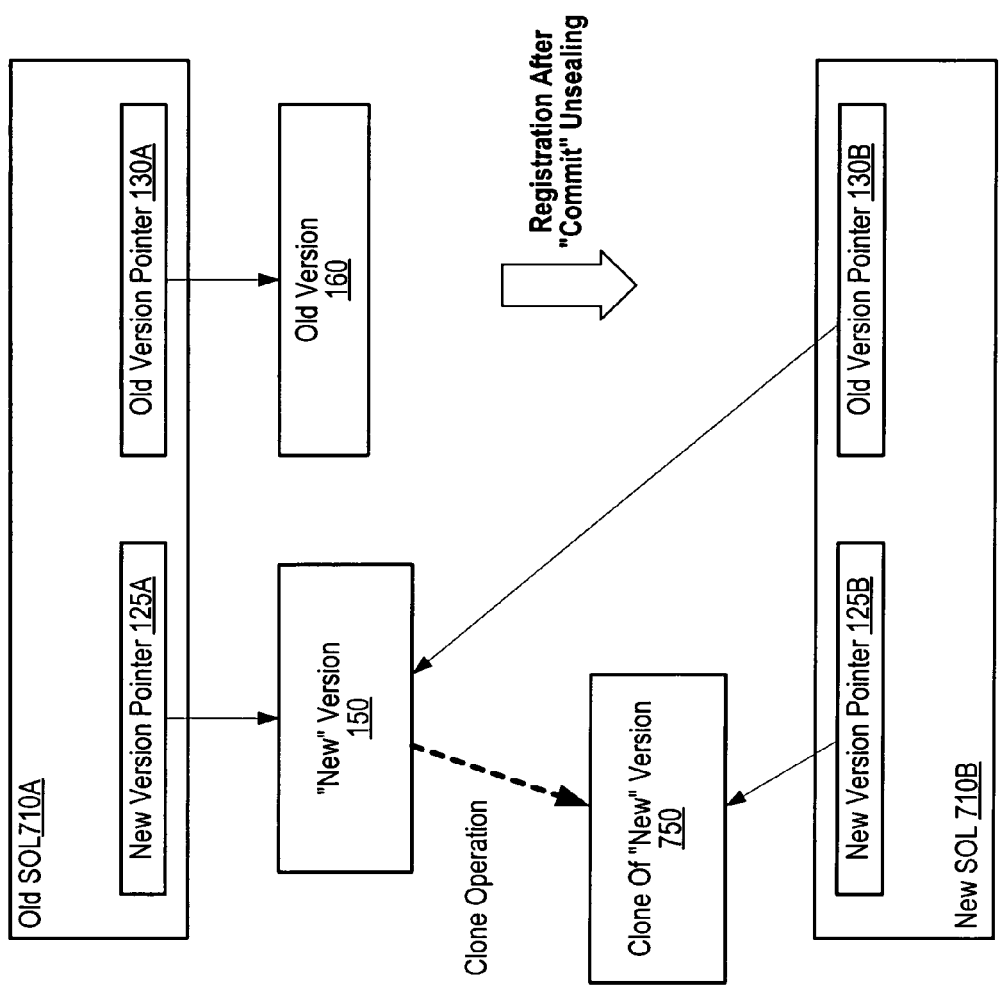
FIG. 7 is a block diagram illustrating aspects of the operations performed by a transactional-memory manager to set data pointers of a newly constructed synchronized object locator after an unsealing resulting from a commit, according to one embodiment.

FIG. 7 is a block diagram illustrating aspects of the operations performed by transactional-memory manager 105 to set the data pointers 125 and 130 of a newly constructed SOL after an unsealing resulting from a commit (i.e., operations corresponding to block 630 of FIG. 6), according to one embodiment. The "old" SOL 110 (the one in use prior to the unsealing) is referred to in FIG. 7 (and FIG. 8) using reference numeral 710A, and the "new" SOL created for the requesting transaction is referred to using reference numeral 710B. If the synchronized object 107 was unsealed as a result of a commit, this means that any changes made to the new data version 150 of the old SOL 710A are to be made visible to other transactions 155 such as the requesting transaction. Accordingly, the new data version 150 of the old SOL 710A may be cloned or copied to version 750, the new data pointer 125B of the new SOL 710B may be set to point to the cloned version 750, and the old data pointer 130B of the new SOL 710B may be set to point to the new data version 150 of the old SOL 710A. In some implementations, the old version 160 of the data of the old SOL 710A may be discarded or freed after the new SOL 710B has been installed in operations corresponding to step 635 of FIG. 6 as described below (or, for example in embodiments employing automatic garbage collection, the old version 160 may be reclaimed eventually by a garbage collector).

Figure 8:
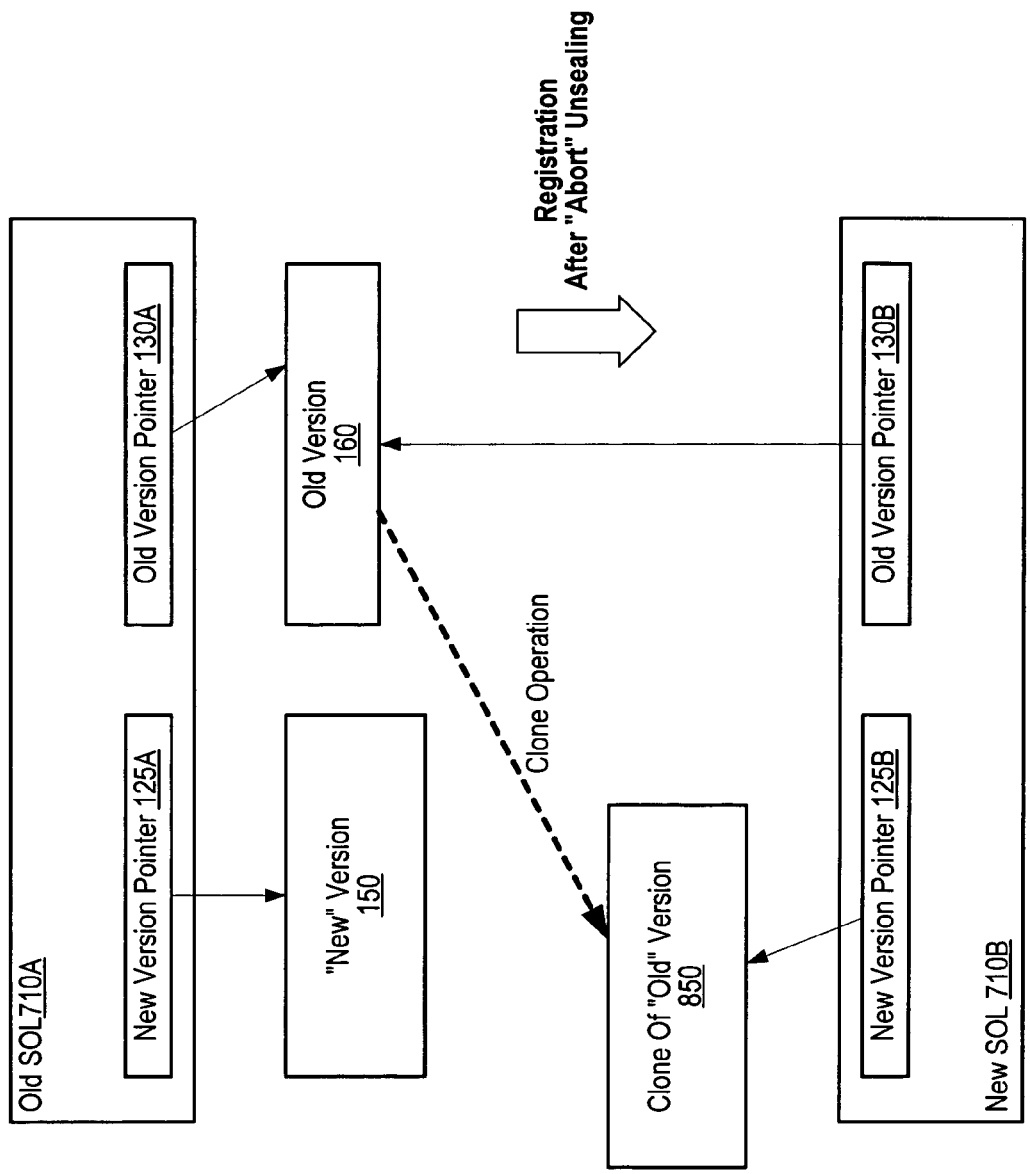
FIG. 8 is a block diagram illustrating aspects of the operations performed by a transactional-memory manager to set data pointers of a newly constructed synchronized object locator after an unsealing resulting from an abort, according to one embodiment.

FIG. 8 is a block diagram illustrating aspects of the operations performed by transactional-memory manager 105 to set the data pointers 125 and 130 after an unsealing resulting from an abort (i.e., operations also corresponding to block 630 of FIG. 6), according to one embodiment. If the synchronized object 107 was unsealed as a result of an abort, this means that any changes made to the new data version 150 of the old SOL 710A are to be discarded, and not made visible to other transactions 155 such as the requesting transaction. Accordingly, the old data version 160 of the old SOL 710A may be cloned or copied to version 850, the new data pointer 125B of the new SOL 710B may be set to point to the cloned version 850, and the old data pointer 130B of the new SOL 710B may be set to point to the old data version 160 of the old SOL 710A. In some implementations, the new version 150 of the data of the old SOL 710A may be discarded or freed after the new SOL 710B has been installed in operations corresponding to step 635 of FIG. 6 as described below (or, for example in embodiments employing automatic garbage collection, the new version 150 may be eventually reclaimed by a garbage collector).

Returning now to FIG. 6, after the pointer manipulations of block 630 are completed, in some embodiments the old SOL may be atomically replaced by the new SOL (block 635). A pointer to the new version of the data and a success indicator may be returned to the requesting transaction that issued the registration request, indicating that the registration request has succeeded. It is noted that in the embodiment depicted in FIG. 6, the registration request always eventually succeeds, either after the synchronized object 107 for which registration is requested is unsealed, or (if the object is unsealed at the time the registration request is received) without requiring unsealing. In other embodiments, transactional-memory manager 105 may be configured to reject a registration request in some circumstances: e.g., if the targeted synchronized object 107 is sealed, or if only a limited number of transactions are to be permitted to register successfully for a given synchronized object 107. For example, in a travel reservation application in which a user specifies a plurality of acceptable dates and/or times for a flight, several transactions may be initiated to search for the different alternative acceptable flights, and the number of concurrent transactions may be limited, e.g., to N, by rejecting registration requests after the first N transactions have been registered on the same synchronized object. In one embodiment, registration and data access may be implemented using different interfaces: e.g., a transaction 155 may register for synchronization using a first interface such as registerForSynchronizer( ), and may obtain a handle or pointer to the data (e.g., to the synchronized object locator 110 for the object 107) using a second interface such as open( ). In such embodiments, the open( ) interface may be used by both synchronizing and nonsynchronizing transactions 155 to access transactional data: e.g., nonsynchronizing transactions may invoke open( ) to access data encapsulated within unsynchronized transactional objects 109, and synchronizing transactions may, after separately registering for synchronization, invoke open( ) to access data encapsulated within synchronized transactional objects 107.

Figure 9:
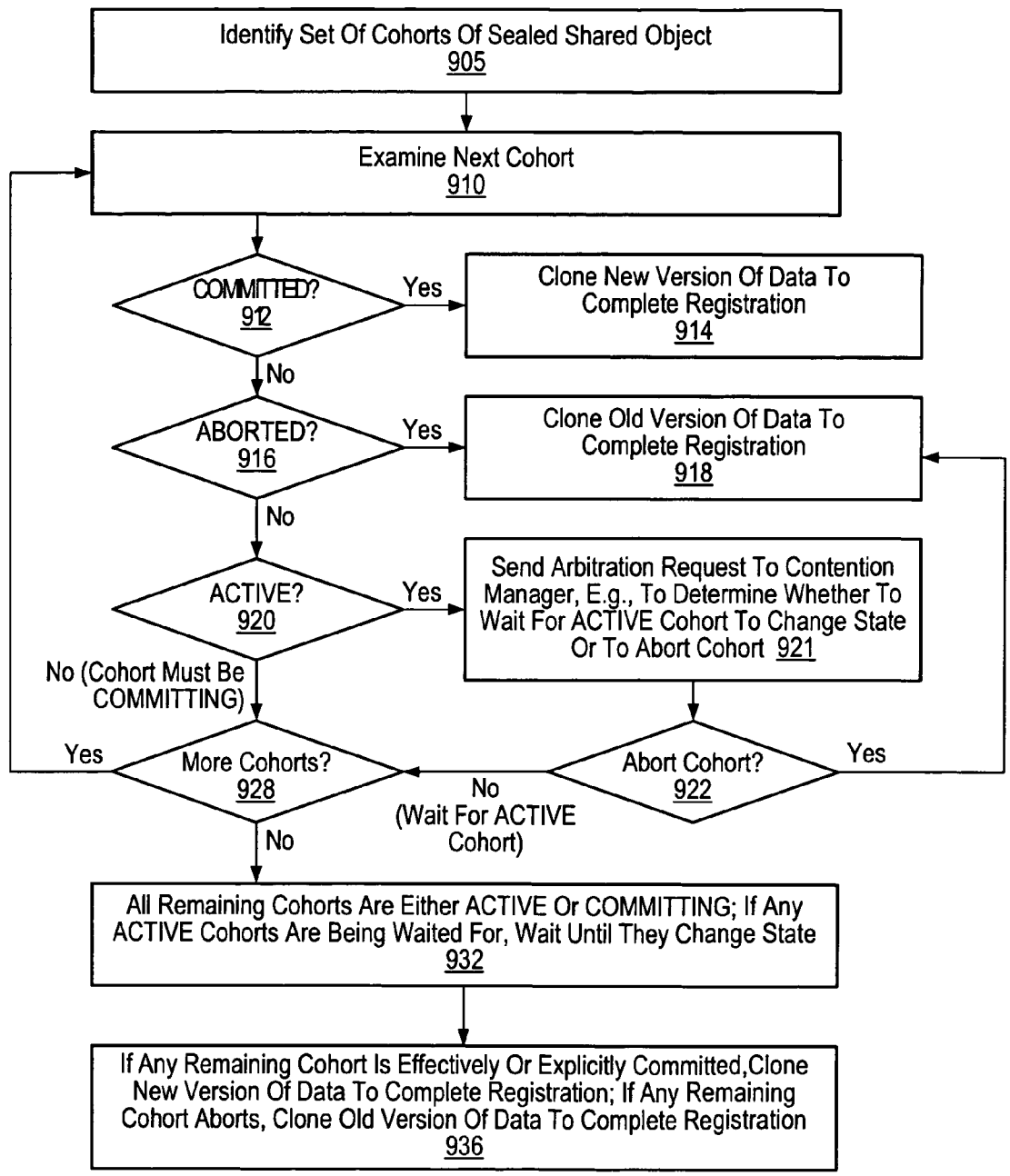
FIG. 9 is a flow diagram illustrating aspects of the operation of transactional-memory manager during an unseal operation on a sealed synchronized object, according to one embodiment.

As noted in the description of block 620 of FIG. 6, transactional-memory manager 105 may be configured to unseal a sealed synchronized object 107 in response to a registration request in some embodiments. FIG. 9 is a flow diagram illustrating aspects of the operation of transactional-memory manager 105 during an unseal operation on a sealed synchronized object 107, according to one embodiment. During the unsealing, transactional-memory manager 105 may be configured to identify the set of cohorts linked to the sealed synchronized object 107 (block 905 of FIG. 9), e.g., via a traversal of the C-List 115 of the object and the shared object lists 330 of each collaborator on the C-List, and to examine the transactional states of the cohorts. Depending on the transactional states of the cohorts, the process of enumeration and/or examination of the cohort set may be cut short in some embodiments, while in other cases, the entire cohort set may have to be enumerated and the transactional states of the entire cohort set may have to be examined before the object 107 is unsealed. In the embodiment depicted in FIG. 9, the cohorts are examined one at a time; however, in various implementations, the cohort set may also be examined (and/or enumerated) by a plurality of parallel threads of the transactional-memory manager.

When examining a next cohort (block 910) in the cohort set, if the cohort is in the COMMITTED state (as determined in block 912), transactional-memory manager 105 may deduce that all the cohorts are either already committed or are going to be committed (since no one cohort could be in the COMMITTED state if there is a possibility of any of the other cohorts not committing). Accordingly, transactional-memory manager 105 may be configured to unseal the object 107, cloning the new version of the encapsulated data to complete registration (block 914), as also illustrated in FIG. 7 and in the portion of block 630 of FIG. 6 describing the "unseal after commit" operations. In the depicted embodiment, no further examination of other cohorts may be required to complete the registration if a cohort in the COMMITTED state is found. In some embodiments, transactional-memory manager 105 may be configured to commit any remaining uncommitted cohorts of the cohort set when one cohort in the COMMITTED state is found during an unseal operation.

If a cohort in the ABORTED state is found (block 916), once again no further examination of other cohorts may be required; the transactional-memory manager 105 may deduce that all other cohorts are either already in or eventually going to be in the ABORTED state. Accordingly, transactional-memory manager 105 may unseal the object 107, and clone the old version of the complete registration (block 918), as illustrated in FIG. 8 and in the "unseal after abort" portion of block 630 of FIG. 6. In some embodiments, transactional-memory manager 105 may be configured to abort any remaining cohorts of the cohort set when one cohort in the ABORTED state is found during an unseal operation.

If the cohort being examined is found in the ACTIVE state (block 920), this means that the requesting transaction is contending with a currently active transaction on a synchronized object 107 that has been sealed. The sealed state of the object 107 may indicate that no additional transactions, apart from those transactions in the current cohort set associated with the object 107, are to be allowed to view the changes made to the object 107 at least until it is determined whether the cohort set is to commit or abort. Accordingly, when an ACTIVE cohort is encountered, transactional-memory manager 105 may be configured to determine, based on a conflict resolution algorithm in use, whether to wait for the ACTIVE cohort to voluntarily change state, or whether to instead abort the ACTIVE cohort. In the embodiment depicted in FIG. 9, the transactional-memory manager may be configured to send an indication of the conflict between the ACTIVE cohort and the transaction requesting registration to a contention manager 185 (FIG. 1) to arbitrate between the conflicting transactions and determine what action, if any, is to be taken to resolve the conflict (block 921 of FIG. 9).

Contention manager 185 may be a modular or pluggable component in some embodiments, e.g., allowing any of various contention management schemes to be employed without being tightly coupled to other functionality of transactional-memory manager 105. In some implementations, for example, each thread of execution in system 100, and therefore each transaction 155, may have a priority associated with it, and contention manager 185 may be configured to decide that if the ACTIVE cohort is of a lower priority than the transaction 155 requesting registration, the ACTIVE cohort should be aborted. In some priority-based schemes, the requesting transaction may wait for a higher-priority ACTIVE transaction to change state, while in other priority-based schemes, the requesting transaction may itself be aborted if it contends with a higher-priority ACTIVE transaction on a sealed object 107. In another implementation, a threshold maximum wait time may be provided as a configurable parameter to the contention manager 185, and the contention manager may determine that the requesting transaction is to wait for the ACTIVE transaction to change state until the requesting transaction has waited for at most the threshold maximum wait time, after which the ACTIVE transaction may be aborted. If the contention manager 185 determines to abort the ACTIVE transaction (block 922), the entire cohort set must also be aborted, and the operations of block 918 of FIG. 9 may be performed to unseal the object 107. If the contention manager 185 instead determines that the requesting transaction should wait for the ACTIVE transaction to change state, in the depicted embodiment the transactional-memory manager 105 may be configured to examine the next cohort if there are any remaining cohorts (block 928), and may, for example, place the ACTIVE transaction in a list of transactions to be re-examined later. In other embodiments, instead of proceeding to examine the next cohort, transactional-memory manager 105 may be configured to wait until the ACTIVE transaction does change state.

If the cohort being examined is not in the COMMITTED, ABORTED, or ACTIVE states, it must be in the COMMITTING state in the embodiment depicted in FIG. 9. On encountering a cohort in the COMMITTING state, in the depicted embodiment, if there are any unexamined cohorts left (as detected in block 928), transactional-memory manager 105 may be configured to continue with the examination of the states of the remaining unexamined cohorts—e.g., to repeat the operations starting at block 910. The COMMITTING cohort may, in some implementations, be placed in a set of cohorts to be re-examined later. In other embodiments, if a COMMITTING transaction is encountered during unsealing, instead of proceeding to the next cohort, the transactional-memory manager 105 may wait until the COMMITTING transaction either commits or aborts.

If, after all the cohorts have been examined, no cohort in the COMMITTED or ABORTED states has been found (and no decision to abort any ACTIVE cohort has been made), this means that all remaining cohorts are in the COMMITTING state or are in the ACTIVE state and are being waited for (corresponding to the "No" transition out of decision block 928). Transactional-memory manager 105 may then be configured to wait for any remaining ACTIVE cohorts to change state (block 932). An ACTIVE cohort may change state to the COMMITTING state or the ABORTED state. If it changes to the ABORTED state, the cohort set must be aborted; the object 107 may be unsealed and the operations corresponding to block 918 may be performed to complete registration (block 936). If all remaining cohorts change state to the COMMITTING state and none changes to the ABORTED state, and if all the synchronized objects on which the COMMITTING cohorts are synchronized are also sealed, then the cohort set may be deemed to be "effectively committed" or "logically committed" herein, because the only remaining possibility for a final state of each cohort is the COMMITTED state. If the remaining cohorts are determined to be effectively committed, the "commit after unseal" operations corresponding to block 914 may be performed. In some embodiments, if all remaining cohorts are in the COMMITTING state and at least some of the synchronized objects 107 on which the cohort set is synchronized are unsealed when block 936 is reached, transactional-memory manager 105 may be configured to wait until all the synchronized objects are sealed (or until one or more cohorts of the cohort set abort).

Any of a number of variations of the unsealing technique described above may be employed in various embodiments. In one embodiment, the entire cohort set may be enumerated first and the cohorts then examined one by one; in another embodiment, each cohort's state may be examined before the next cohort of the set is identified. In some embodiments, if a cohort being examined is ACTIVE, transactional-memory manager 105 may simply wait until the cohort changes state to either COMMITTED or ABORTED. In one embodiment, multiple threads of the transactional-memory manager 105 may enumerate and/or examine the states of the cohorts in parallel.

Figure 10:
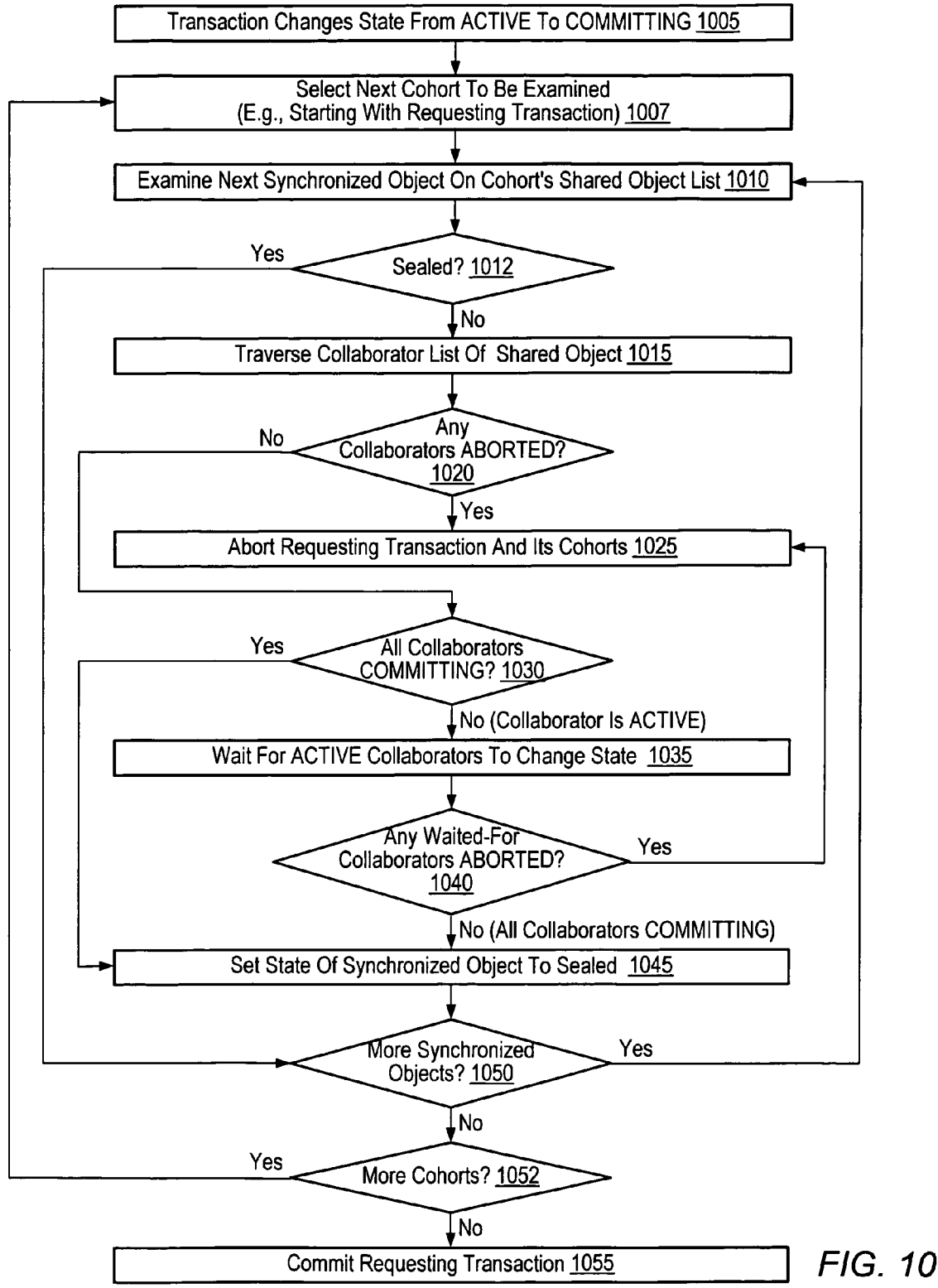
FIG. 10 is a flow diagram illustrating aspects of the operation of a transactional-memory manager during commit processing for a synchronizing transaction that has successfully registered to synchronize on at least one object, according to one embodiment.

FIG. 10 is a flow diagram illustrating aspects of the operation of transactional-memory manager 105 during commit processing for a synchronizing transaction 155 that has successfully registered to synchronize on at least one object 107, according to one embodiment. In the depicted embodiment, a call by the requesting transaction to an API such as commitTransaction( ) may serve as the single indicator that the requesting transaction is to change state to COMMITTING and then to COMMITTED; i.e., no separate request to change state from COMMITTING to COMMITTED may be required. In other embodiments, different APIs may be used to request that the transaction change from ACTIVE to COMMITTING and then from COMMITTING to COMMITTED: e.g., a readyToCommit( ) API may be used to indicate that the transaction is to change state to COMMITTING, and then a commitTransaction( ) API may be used to change state from COMMITTING to COMMITTED.

As shown in block 1005 of FIG. 10, the commit processing may begin by the requesting transaction attempting to atomically change its state from ACTIVE to COMMITTING. The attempt may fail if the transaction is aborted. If the attempt succeeds, the requesting transaction's state may be changed to COMMITTING, and the transactional-memory manager 105 may be configured to attempt to seal each synchronized object 107 on the shared object lists 330 of the requesting transaction and its cohorts as described below. After all the synchronized objects 107 on the shared object lists 330 of the cohorts are sealed, the requesting transaction may be committed (e.g., the state of the requesting transaction may be set to COMMITTED, and the objects 107 may be unsealed, making modifications made by the requesting transactions visible to other transactions). In the depicted embodiment, the transactional-memory manager 105 may traverse the shared object lists 330 sequentially, sealing each object 107 in sequence if its not already sealed; in other embodiments, multiple parallel threads may be used to examine and seal a plurality of synchronized objects 107 concurrently.

Transactional-memory manager 105 may be configured to select the next cohort of the requesting transaction whose shared object list is to be examined (block 1007), e.g., starting with the requesting transaction itself. The next synchronized object 107 on the shared object list 330 of the selected cohort may then be examined (block 1010). If the object 107 is not sealed (as detected in block 1012), transactional-memory manager 105 may traverse the C-List 115 of the object 107 (block 1015) to examine the states of the collaborator transactions identified in the C-List and eventually seal the object 107 if the collaborators are in acceptable states. If the object 107 is already sealed (as detected in block 1012) (e.g., as a result of a commit request issued by another cohort), and if unexamined synchronized objects 107 remain on the shared object list 330 (as detected in block 1050), the next object 107 on the shared object list may be examined.

If any of the collaborators of an as-yet-unsealed object 107 on the shared object list 330 of the requesting transaction is in the ABORTED state (as determined in decision block 1020), the requesting transaction and its cohorts may be aborted (block 1025). If all the collaborators are in the COMMITTING state (as detected in block 1030), the synchronized object 107 may be sealed (block 1045), and if there are more synchronized objects on the shared object list (as determined in decision block 1050), the next synchronized object may be examined in turn (repeating the operations of block 1010 onwards). If additional cohorts remain after the entire shared object list of the cohort has been examined (as detected in decision block 1052), the shared object list of the next cohort may be examined.

If at least one of the collaborators is neither ABORTED nor COMMITTING, it is typically in the ACTIVE state. (It is noted that under certain race conditions, it is possible for transactional-memory manager 105 to encounter a collaborator in the COMMITTED state after step 1012 because the collaborator may have committed after the seal was checked. In such a case, the requesting transaction may also be committed along with the rest of the cohort set.) The transactional-memory manager 105 may be configured to wait for any ACTIVE collaborators to change state to either COMMITTING or ABORTED (block 1035). If any of the waited-for collaborators aborts (as detected in decision block 1040), the requesting transaction and its cohorts may be aborted (block 1025); otherwise, all collaborators are in the COMMITTING state, so the object 107 may be sealed (block 1045) and any remaining synchronized objects 107 on the shared object list 330 may be examined in turn.

After all the synchronized objects 107 on the shared object list have been sealed, the transaction may be committed (block 1055) unless any of the cohorts has aborted. All the transaction's cohorts may also be committed at this point in some embodiments. The transaction's state may be changed to COMMITTED, and the objects that it has synchronized on may be unsealed, thus making visible to other transactions any modifications made by the cohorts. As noted earlier, in some implementations the sealed state indicator may be implemented as a special entry in the C-List 115 of the synchronized object 107. In one such implementation where the C-List 115 is implemented as an ordered linked list, in order to seal the synchronized object, the special entry may be atomically inserted at the head of the C-List to seal the object.

In some embodiments, a nonsynchronizing transaction may contend with uncommitted synchronizing transactions for access to the same unsynchronized object 109. For example, in addition to accessing one or more synchronized objects 107A using the techniques described above, a synchronizing transaction 155A may access an unsynchronized transactional object 109A (e.g., by invoking an open( ) API on the object 109), and a nonsynchronizing transaction (designated herein as transaction 155N) may also attempt to access the same unsynchronized transactional object 109A before the synchronizing transaction commits/aborts. If the synchronizing transaction 155A is in the ACTIVE state when the nonsynchronizing transaction's access request is received, transactional-memory manager 105 may treat the synchronizing transaction 155A as an unsynchronized transaction, and the conflict may be resolved between transactions 155A and 155N alone (i.e., without taking 155A's cohorts into account), e.g., using a contention manager 185 to arbitrate between the transactions. However, if synchronizing transaction 155A is in the COMMITTING state when the conflict occurs, its cohorts may have to be taken into account.

Figure 11:
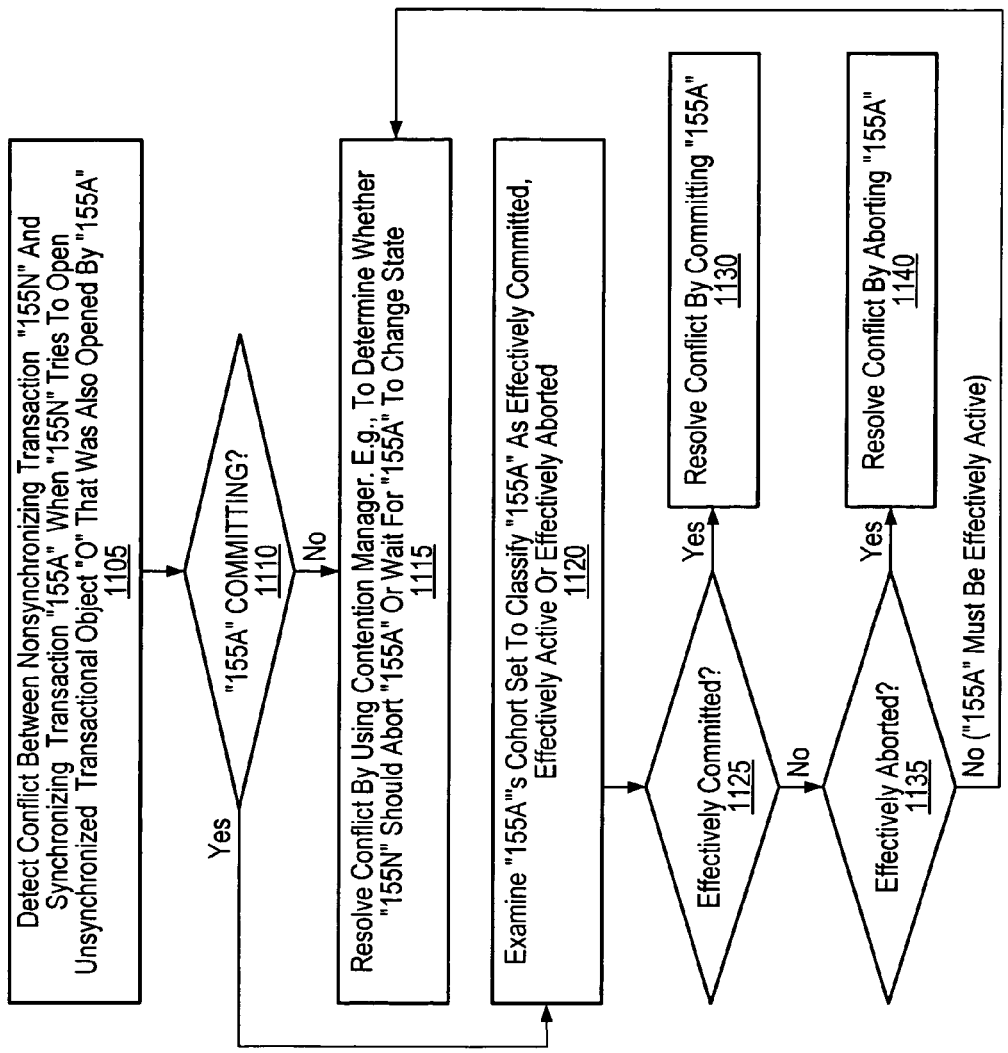
FIG. 11 is a flow diagram illustrating aspects of the operation of a transactional-memory manager in resolving a conflict between a synchronizing transaction and a nonsynchronizing transaction, according to one embodiment.

FIG. 11 is a flow diagram illustrating aspects of the operation of transactional-memory manager 105 in resolving a conflict between a synchronizing transaction 155A that is in either the COMMITTING state or the ACTIVE state, and a nonsynchronizing transaction 155N, according to one embodiment. (It is noted that if 155A is in the COMMITTED state or the ABORTED state, 155A's operations have been completed, so the question of a conflict with another transaction may not arise; thus only the ACTIVE and COMMITTING states of 155A may need to be considered.) The transactional-memory manager 105 may detect the conflict when, for example 155N attempts to open an unsynchronized object "O" that was earlier opened by 155A (block 1105 of FIG. 11). If 155A is not in the COMMITTING state (as detected in block 1110) (and is therefore in the ACTIVE state), the transactional-memory manager may be configured to refer the conflict to a contention manager 185. As noted above, contention manager 185 may be a pluggable component of, or accessible to, transactional-memory manager 105, and may be configured to implement any of various contention management schemes without being tightly coupled to other functionality of transactional-memory manager 105. In some implementations, for example, contention manager 185 may be configured to abort the conflicting transaction with a lower priority. In some implementations, contention manager 105 may determine that the nonsynchronizing transaction 155N is to wait until 155A and its cohorts commit or abort before providing access to the object "O" to 155N. In other implementations, when a conflict between synchronizing transaction 155A and nonsynchronizing transaction 155N is referred to it, contention manager 185 may be configured to always abort the synchronizing transaction, or always abort the nonsynchronizing transaction. Contention manager 185 may be configured to maintain statistics on the number of aborts and commits on synchronizing and nonsynchronizing transactions, and make the decision on how the conflict is to be resolved based on a heuristic derived from the statistics. Other techniques to determine how to resolve conflicts between synchronizing and nonsynchronizing transactions may also be used in various embodiments.

If the conflicting synchronizing transaction 155A is in the COMMITTING state, however, transactional-memory manager 105 may be configured to examine 155A's cohort set to designate 155A as either "effectively committed", "effectively active", or "effectively aborted" (block 1120). A synchronizing transaction may be deemed to be effectively committed if all its cohorts are in the COMMITTING or COMMITTED state and all the synchronized objects linked to the cohorts are sealed; in this case, the only possible end state for the transaction is the COMMITTED state. If, after examining 155A's cohorts, transactional-memory manager 105 determines that 155A is effectively committed (as detected in block 1125), transactional-memory manager 105 may commit 155A (block 1130) to resolve the conflict with 155N, thereby making visible to 155N any changes to the unsynchronized transactional object "O" that were made by 155A.

If any of the conflicting synchronizing transaction 155A's cohorts are found in the ABORTED state, 155A may be deemed "effectively aborted" (as detected in block 1135), and may be actually aborted by transactional-memory manager 105 to resolve the conflict with 155N (as indicated at block 1140); in this case, 155A's changes to "O" may be discarded and not made visible to 155N. If 155A is neither effectively committed or effectively aborted, it must be "effectively active" and the contention manager 185 may be used to resolve the conflict (block 1115), just as the contention manager would have been used if 155A had been in the ACTIVE state.

In various embodiments, the basic mechanism for synchronizing on shared data objects 107 described above may be extended to provide enhanced functionality using any of a number of techniques. As noted above, in one embodiment, a synchronize( ) call to register a transaction 155 may be extended to return an indication that the registration request failed, e.g., to limit the number of cohorts based on application-specific logic or to impose a system-wide limit on the number of cohorts that can be included in a cohort set. In some embodiments, transactions 155 may be allowed to unregister, e.g., by invoking an unsynchronize( ) method, if they have not actually modified data encapsulated by the object or objects 107 for which they had earlier registered. In other embodiments, transactional-memory manager 105 may be configured to abort a set of collaborating transactions 155, and discard changes made by the aborted set of transactions, as long as no other transactions have observed the uncommitted modifications of that set. Such a capability may be useful, for example, in implementing various types of producer-consumer relationships including exchanger channels. In some embodiments, an "observe" method or interface may be supported, allowing a requesting transaction to read the encapsulated data of a synchronized object 107 before generating a registration request; thus, the decision on whether or not to register and join a cohort set may be made based on the contents of the encapsulated data in such embodiments. In some embodiments, an observe method may allow a particular transaction to identify one or more existing cohorts, and to make the decision on whether to join the cohort set based at least in part on the current membership of the cohort set.

Figure 12:
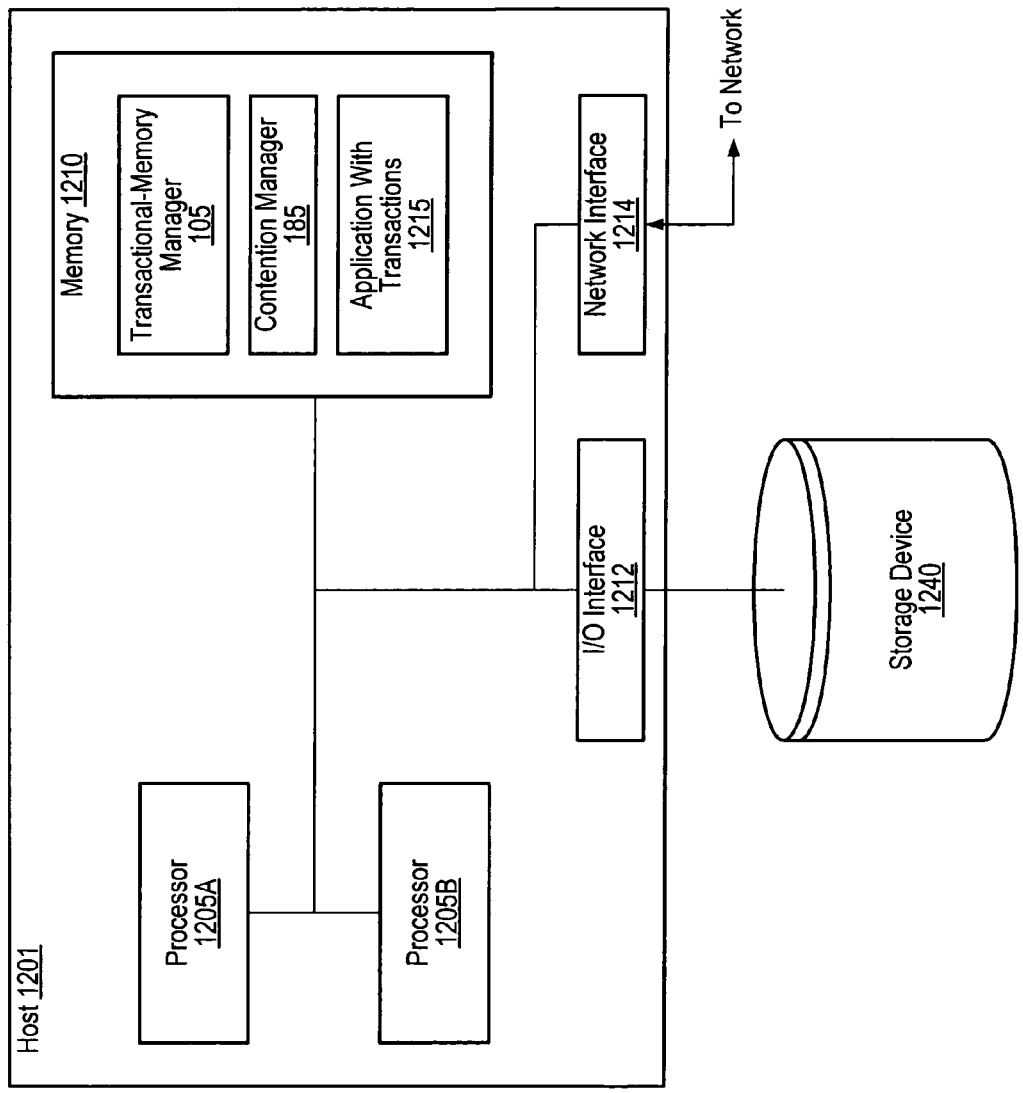
FIG. 12 is a block diagram illustrating a computer host, according to one embodiment.

FIG. 12 is a block diagram illustrating a computer host 1201, according to one embodiment. Host 1201 may comprise one or more processors 1205 (e.g., 1205A and 1205B), which may be implemented using any desired architecture or chip set, such as the SPARC® architecture from Sun Microsystems, Inc. or the x86-compatible architectures from Intel Corporation, Advanced Micro Devices, etc. Program instructions that may be executable to implement the functionality of transactional-memory manager 105, contention manager 185, and transactions 155 may be partly or fully resident within a memory 1210 at a given point in time, and may also be stored on a storage device 1240. In some embodiments, transactional-memory manager 105 and contention manager 105 may be included within a virtual machine process (such as a Java™ virtual machine (JVM)) in memory 1210 at which an application 1215 that defines transactional data objects 107 and 109 are executed and at which threads implementing transactions 155 run. In various embodiments, transactions 155 may be included within threads or processes that may implement any type of individual or standalone application (e.g., a database application or a scientific simulation application), an instance or component of a distributed application, etc. Memory 1210 may be implemented using any appropriate medium such as any of various types of RAM (e.g., DRAM, SDRAM, RDRAM, SRAM, etc.). In addition to processors 1205 and memory 1210, host 1201 may also include one or more I/O interfaces 1212 providing access to storage devices, one or more network interfaces 1214 providing access to a network and the like. Any of a variety of storage devices may be used to store the instructions as well as data (e.g., for transactional-memory manager 105, contention manager 185 and threads comprising transactions 155) in different embodiments, include any desired type of persistent and/or volatile storage devices, such as individual disks, disk arrays, optical devices such as CD-ROMs, CD-RW drives, DVD-ROMs, DVD-RW drives, flash memory devices, various types of RAM and the like.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
one or more processors; and
a memory coupled to the one or more processors, wherein the memory stores program instructions executable by the one or more processors to implement a memory manager configured to:
coordinate memory access requests specifying data locations within the memory, wherein said coordinating comprises:
recording, within a collaborator record of a first shared data object in the memory, identifications of a set of two or more transactions that have each requested synchronization on the first shared data object;
in response to a commit request from a given transaction of the set, determining whether to commit or abort the given transaction based at least in part on transactional states of one or more other transactions of the set, wherein said determining comprises examining the collaborator record to identify the one or more other transactions of the set; and
committing or aborting the given transaction according to said determining.

2. The system as recited in claim 1, wherein the coordination further comprises:
recording, within a respective shared data object record for each transaction of the set of transactions, an identification of one or more additional shared data objects on which the corresponding transaction has requested synchronization;

in response to the commit request, examining the shared data object record of the given transaction to identify one or more additional shared data objects on which the given transaction has requested synchronization;

wherein said determining whether to commit or abort the given transaction is based at least in part on a transactional state of an additional transaction identified in a collaborator record of an additional shared data object of the one or more additional shared data objects.

3. The system as recited in claim 1, wherein the coordinating further comprises:

in response to determining to commit the given transaction, determining to commit each other transaction of the set and committing each other transaction of the set; and in response to determining to abort the given transaction, determining to abort each other transaction of the set and aborting each other transaction of the set.

4. The system as recited in claim 1, wherein said determining whether to commit or abort the given transaction comprises:

determining to commit the given transaction if any one of the other transactions is in a committed state.

5. The system as recited in claim 1, wherein said determining whether to commit or abort the given transaction comprises:

determining to commit the given transaction if each of the other transactions in the set is in a committing state indicating that the other transaction has issued a commit request and has not yet been committed, and if none of the other transactions in the set is in an aborted state.

6. The system as recited in claim 1, wherein said determining whether to commit or abort the given transaction comprises:

determining to abort the given transaction if any one of the other transactions in the set is in an aborted state.

7. The system as recited in claim 1, wherein said determining whether to commit or abort the given transaction comprises:

if a particular other transaction of the set is in an active state indicating that the particular other transaction has not yet issued a commit request, waiting until the particular other transaction changes transactional state;

if the particular other transaction changes state to a committing state indicating that the particular other transaction has issued a request to commit, determining to commit the given transaction if each other transaction of the set is also in a committing state; and if the particular other transaction changes state to an aborted state, determining to abort the given transaction.

8. The system as recited in claim 1, wherein the set of transactions that have requested synchronization on the first shared data object comprises a first transaction and a second transaction, wherein, after the first transaction has successfully requested synchronization on the first shared data object, the first transaction modifies the first shared data object, and after the second transaction has successfully requested synchronization on the first shared data object, the second transaction reads modifications made by the first transaction to the first shared data object before the first transaction has been committed.

9. The system as recited in claim 1, wherein said recording is responsive to respective registration requests for the first shared data object from each transaction of the set, wherein said coordinating further comprises:

in response to a registration request for the first shared data object from an additional transaction, if the registration request is received before a commit request from any transaction of the set, recording an identification of the additional transaction in the collaborator list of the first data object; and if the registration request is received after the commit request, waiting until the given transaction is committed or aborted before recording an identification of the additional transaction in the collaborator record.

10. The system as recited in claim 9, wherein said coordinating further comprises:

in response to a commit request from any transaction of the set, storing an indication in an object state indicator for the first shared data object that the commit request has been received; and in responding to the registration request from the additional transaction, determining to wait until the given transaction is committed or aborted before recording the identification if said indication is found.

11. A computer-implemented method of coordinating memory access requests specifying data locations within a memory, comprising:

receiving respective registration requests from a set of two or more transactions, wherein each registration request indicates that a corresponding transaction of the set has requested synchronization on a first shared data object within the memory;

recording, within a collaborator record of the first shared data object in the memory, identifications of the two or more transactions of the set;

in response to a commit request from a given transaction of the set, determining whether to commit or abort the given transaction based at least in part on transactional states of one or more other transactions of the set, wherein said determining comprises examining the collaborator record to identify the one or more other transactions of the set; and committing or aborting the given transaction according to said determining.

12. The method as recited in claim 11, further comprising:

recording, within a respective shared data object record for each transaction of the set of transactions, an identification of one or more additional shared data objects on which the corresponding transaction has requested synchronization;

in response to the commit request, examining the shared data object record of the given transaction to identify one or more additional shared data objects on which the given transaction has requested synchronization;

wherein said determining whether to commit or abort the given transaction is based at least in part on a transactional state of an additional transaction identified in a collaborator record of an additional shared data object of the one or more additional shared data objects.

13. The method as recited in claim 11, further comprising:

in response to determining to commit the given transaction, determining to commit each other transaction of the set and committing each other transaction of the set; and in response to determining to abort the given transaction, determining to abort each other transaction of the set and aborting each other transaction of the set.

14. The method as recited in claim 11, wherein said determining whether to commit or abort the given transaction comprises:

determining to commit the given transaction if (a) any one of the other transactions in the set is in a committed state, or (b) each of the other transactions in the set is in a committing state indicating that the other transaction has issued a commit request and has not yet been committed, and if none of the other transactions in the set is in an aborted state; and determining to abort the given transaction if any one of the other transactions in the set is in an aborted state.

15. The method as recited in claim 11, wherein said determining whether to commit or abort the given transaction comprises:

if a particular other transaction of the set is in an active state indicating that the particular other transaction has not yet issued a commit request, waiting until the particular other transaction changes transactional state;

if the particular other transaction changes state to a committing state indicating that the particular other transaction has issued a request to commit, determining to commit the given transaction if each other transaction of the set is also in a committing state; and if the particular other transaction changes state to an aborted state, determining to abort the given transaction.

16. A computer readable medium comprising program instructions, wherein the instructions are computer-executable to implement a memory manager configured to coordinate memory access requests specifying data locations within the memory, wherein said coordinating comprises:

receiving respective registration requests from a set of two or more transactions, wherein each registration request indicates that a corresponding transaction of the set has requested synchronization on a first shared data object within the memory;

recording, within a collaborator record of the first shared data object in the memory, identifications of the two or more transactions of the set;

in response to a commit request from a given transaction of the set, determining whether to commit or abort the given transaction based at least in part on transactional states of one or more other transactions of the set, wherein said determining comprises examining the collaborator record to identify the one or more other transactions of the set; and committing or aborting the given transaction according to said determining.

17. The computer readable medium as recited in claim 16, wherein said coordinating further comprises:

recording, within a respective shared data object record for each transaction of the set of transactions, an identification of one or more additional shared data objects on which the corresponding transaction has requested synchronization;

in response to the commit request, examining the shared data object record of the given transaction to identify one or more additional shared data objects on which the given transaction has requested synchronization;

wherein said determining whether to commit or abort the given transaction is based at least in part on a transactional state of an additional transaction identified in a collaborator record of an additional shared data object of the one or more additional shared data objects.

18. The computer readable medium as recited in claim 16, wherein said coordinating further comprises:

in response to determining to commit the given transaction, determining to commit each other transaction of the set and committing each other transaction of the set; and in response to determining to abort the given transaction, determining to abort each other transaction of the set and aborting each other transaction of the set.

19. The computer readable medium as recited in claim 16, wherein said determining whether to commit or abort the given transaction comprises:

determining to commit the given transaction if (a) any one of the other transactions in the set is in a committed state, or (b) each of the other transactions in the set is in a committing state indicating that the other transaction has issued a commit request and has not yet been committed, and if none of the other transactions in the set is in an aborted state; and determining to abort the given transaction if any one of the other transactions in the set is in an aborted state.

20. The computer readable medium as recited in claim 16, wherein said determining whether to commit or abort the given transaction comprises:

if a particular other transaction of the set is in an active state indicating that the particular other transaction has not yet issued a commit request, waiting until the particular other transaction changes transactional state;

if the particular other transaction changes state to a committing state indicating that the particular other transaction has issued a request to commit, determining to commit the given transaction if each other transaction of the set is also in a committing state; and if the particular other transaction changes state to an aborted state, determining to abort the given transaction.

* * * * *

UNITED STATES PATENT AND TRADEMARK OFFICE
CERTIFICATE OF CORRECTION

PATENT NO. : 7,720,891 B2
APPLICATION NO. : 11/353478
DATED : May 18, 2010
INVENTOR(S) : Victor M. Luchangco et al.

It is certified that error appears in the above-identified patent and that said Letters Patent is hereby corrected as shown below:

On sheet 1 of 12, in Figure 1, Box 109N, line 1, delete "Unynchronized" and insert -- Unsynchronized --, therefor.

On sheet 2 of 12, in Figure 2, Box 107B, line 1, delete "Wlth" and insert -- With --, therefor.

In column 13, line 40, delete "Si" and insert -- S1 --, therefor.

Signed and Sealed this
Twenty-sixth Day of July, 2011

David J. Kappos
*Director of the United States Patent and Trademark Office*